(12) United States Patent
Tsujimoto

(10) Patent No.: US 8,456,485 B2
(45) Date of Patent: Jun. 4, 2013

(54) IMAGE PROCESSING APPARATUS AND METHOD, HEAD MOUNTED DISPLAY, PROGRAM, AND RECORDING MEDIUM

(75) Inventor: Takuya Tsujimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 905 days.

(21) Appl. No.: 12/559,794

(22) Filed: Sep. 15, 2009

(65) Prior Publication Data

US 2010/0091031 A1    Apr. 15, 2010

(30) Foreign Application Priority Data

Oct. 9, 2008   (JP) ................................. 2008-263056

(51) Int. Cl.
*G09G 5/02* (2006.01)
*G09G 5/00* (2006.01)

(52) U.S. Cl.
USPC ................................. 345/589; 345/8; 382/167

(58) Field of Classification Search
None
See application file for complete search history.

(56) References Cited

U.S. PATENT DOCUMENTS

| | | | | |
|---|---|---|---|---|
| 5,189,528 A | * | 2/1993 | Takashima et al. | 358/448 |
| 5,825,443 A | * | 10/1998 | Kawasaki et al. | 349/95 |
| 5,987,104 A | | 11/1999 | Tomimori | |
| 6,857,747 B2 | * | 2/2005 | Pentico et al. | 353/31 |
| 7,255,448 B2 | * | 8/2007 | Greer et al. | 353/84 |
| 7,737,930 B2 | | 6/2010 | Inuzuka et al. | |
| 2009/0244088 A1 | * | 10/2009 | Aragaki et al. | 345/613 |
| 2010/0110368 A1 | * | 5/2010 | Chaum | 351/158 |

FOREIGN PATENT DOCUMENTS

| | | |
|---|---|---|
| JP | 8-205181 | 8/1996 |
| JP | 11-215223 A | 8/1999 |
| JP | 11-298924 A | 10/1999 |
| JP | 2001-275126 A | 10/2001 |
| JP | 2004-153323 | 5/2004 |
| JP | 2006-145798 A | 6/2006 |
| JP | 2008-116624 A | 5/2008 |

\* cited by examiner

*Primary Examiner* — K. Wong
(74) *Attorney, Agent, or Firm* — Fitzpatrick, Cella, Harper & Scinto

(57) ABSTRACT

An image processing apparatus that corrects chromatic aberration that occurs in a display optical system, using a display unit in which respective pixels have a plurality of primary color elements that emit light of respectively differing primary colors, the apparatus comprises an acquisition unit adapted to acquire a displacement amount in which the position of a primary color element used as a light source is used as a reference, for light of each primary color emitted by a primary color element of the display unit, a calculation unit adapted to calculate a display position in the display unit for each primary color component of each pixel in a display image, based on the acquired displacement amount, and a display control unit adapted to display each primary color component of each pixel of the display image at the display position of the display unit calculated by the calculation unit.

8 Claims, 19 Drawing Sheets

F I G. 10A
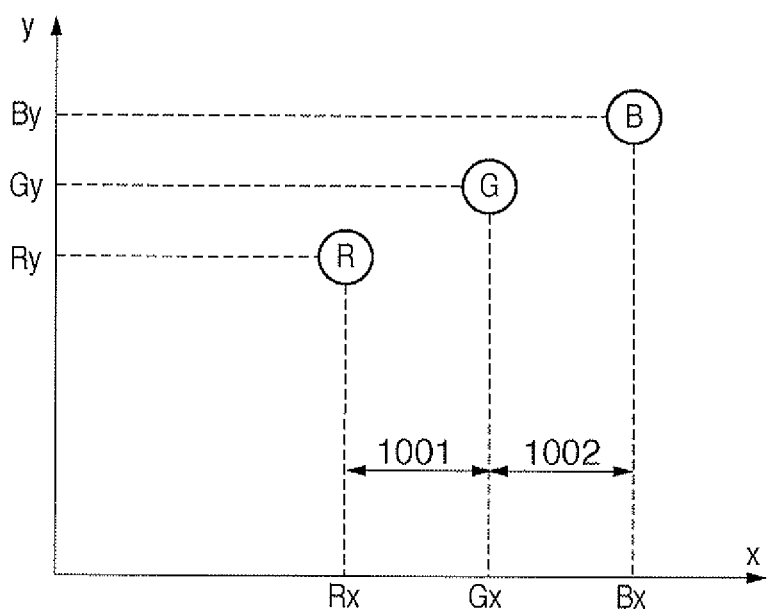

F I G. 10B

| ADDRESS (COORDINATES PRIOR TO CONVERSION) | | COORDINATES AFTER CONVERSION | | | | | |
|---|---|---|---|---|---|---|---|
| | | R | | G | | B | |
| X COORDINATE | Y COORDINATE | X COORDINATE | Y COORDINATE | X COORDINATE | Y COORDINATE | X COORDINATE | Y COORDINATE |
| xn | yn | Rxn | Ryn | Gxn | Gyn | Bxn | Byn |
| | | Gxn-Rxn (TABLE VALUE) | Gyn-Ryn (TABLE VALUE) | | | Bxn-Gxn (TABLE VALUE) | Byn-Gyn (TABLE VALUE) |

F I G. 13A
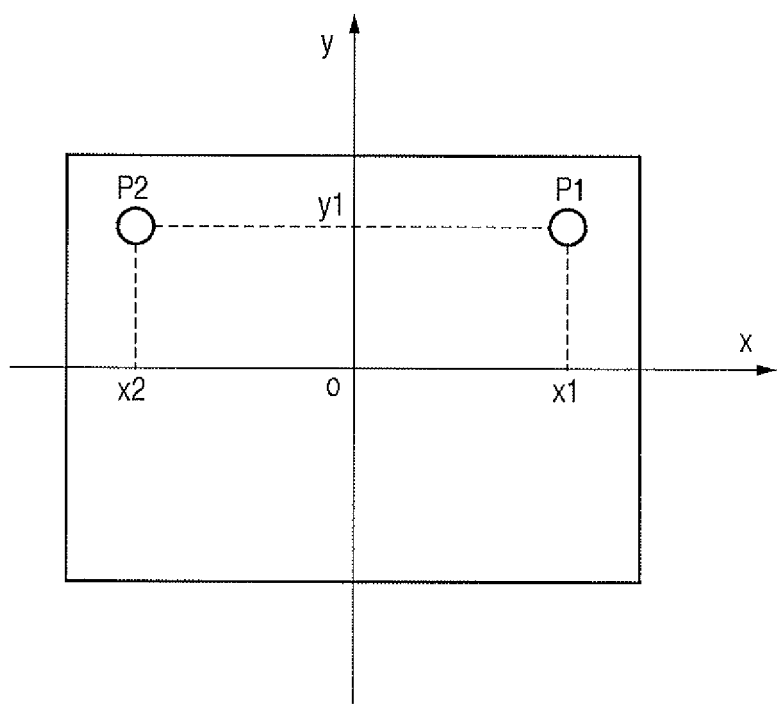

F I G. 13B
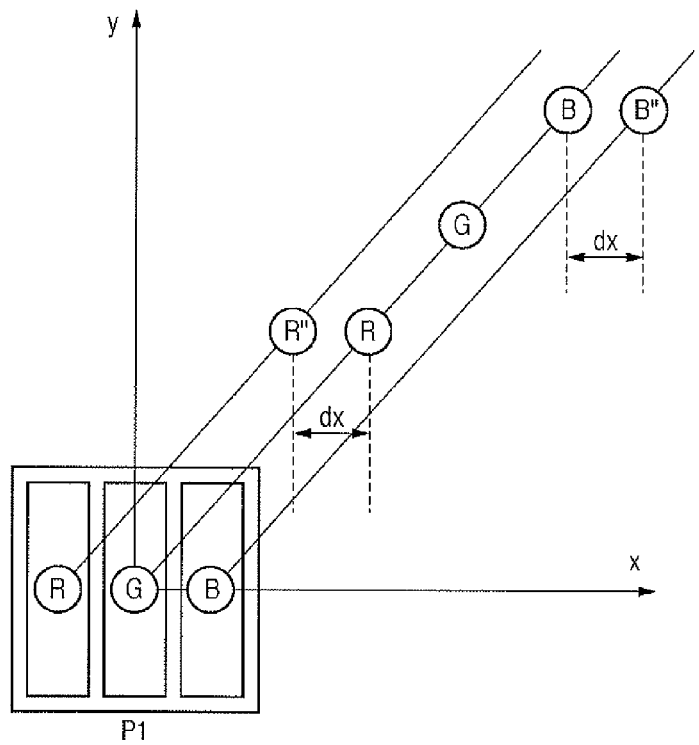
F I G. 13C
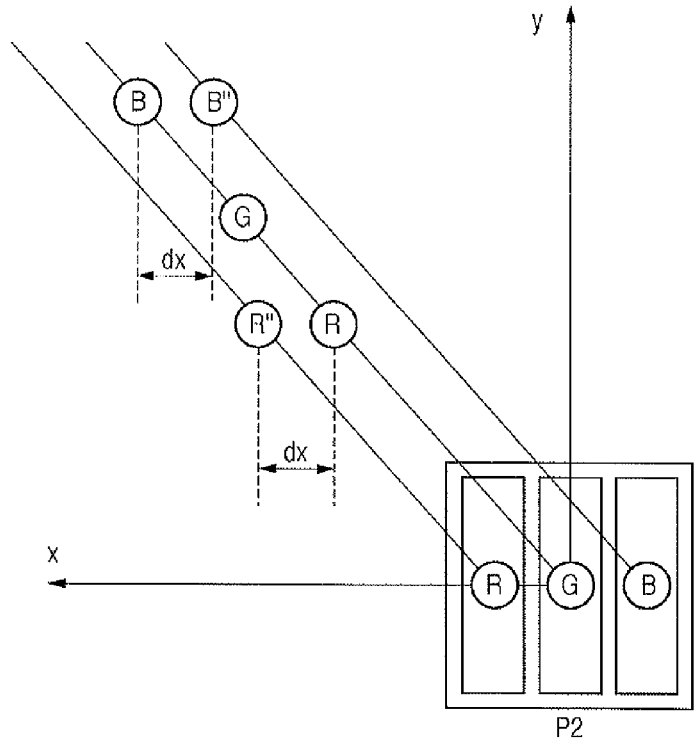

F I G. 14A
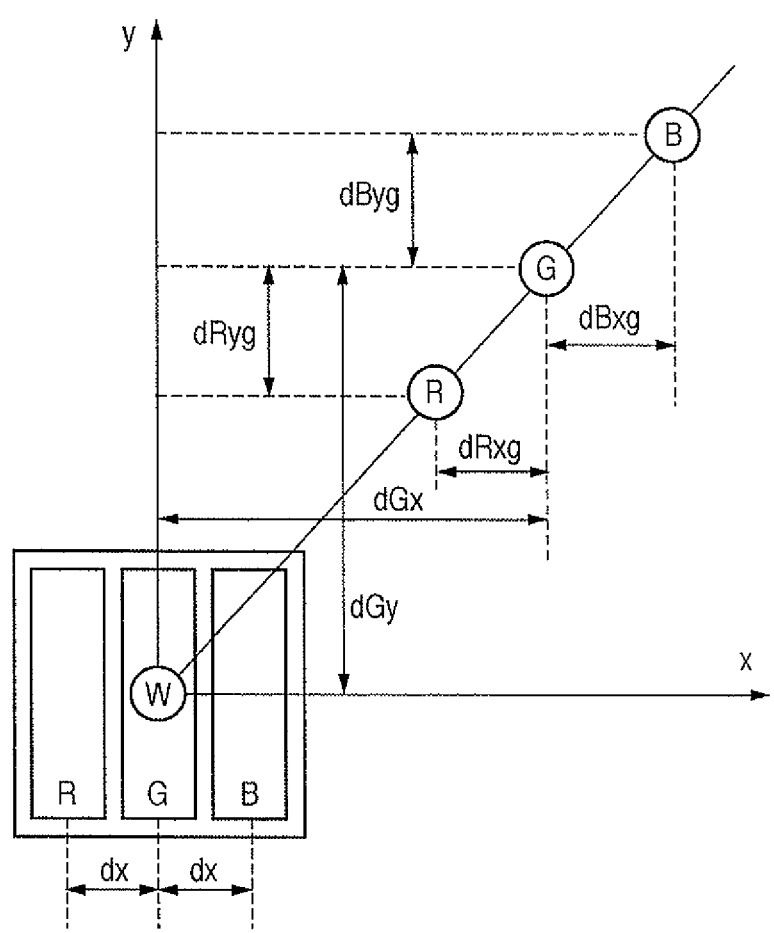

FIG. 14B

| ADDRESS (COORDINATES PRIOR TO CONVERSION) | | CORRECTION VALUES STORED IN TABLE | | | | | |
|---|---|---|---|---|---|---|---|
| | | R | | G | | B | |
| X COORDINATE | Y COORDINATE | X COORDINATE | Y COORDINATE | X COORDINATE | Y COORDINATE | X COORDINATE | Y COORDINATE |
| x | y | dRxg | dRyg | dGx | dGy | dBxg | dByg |

F I G. 17
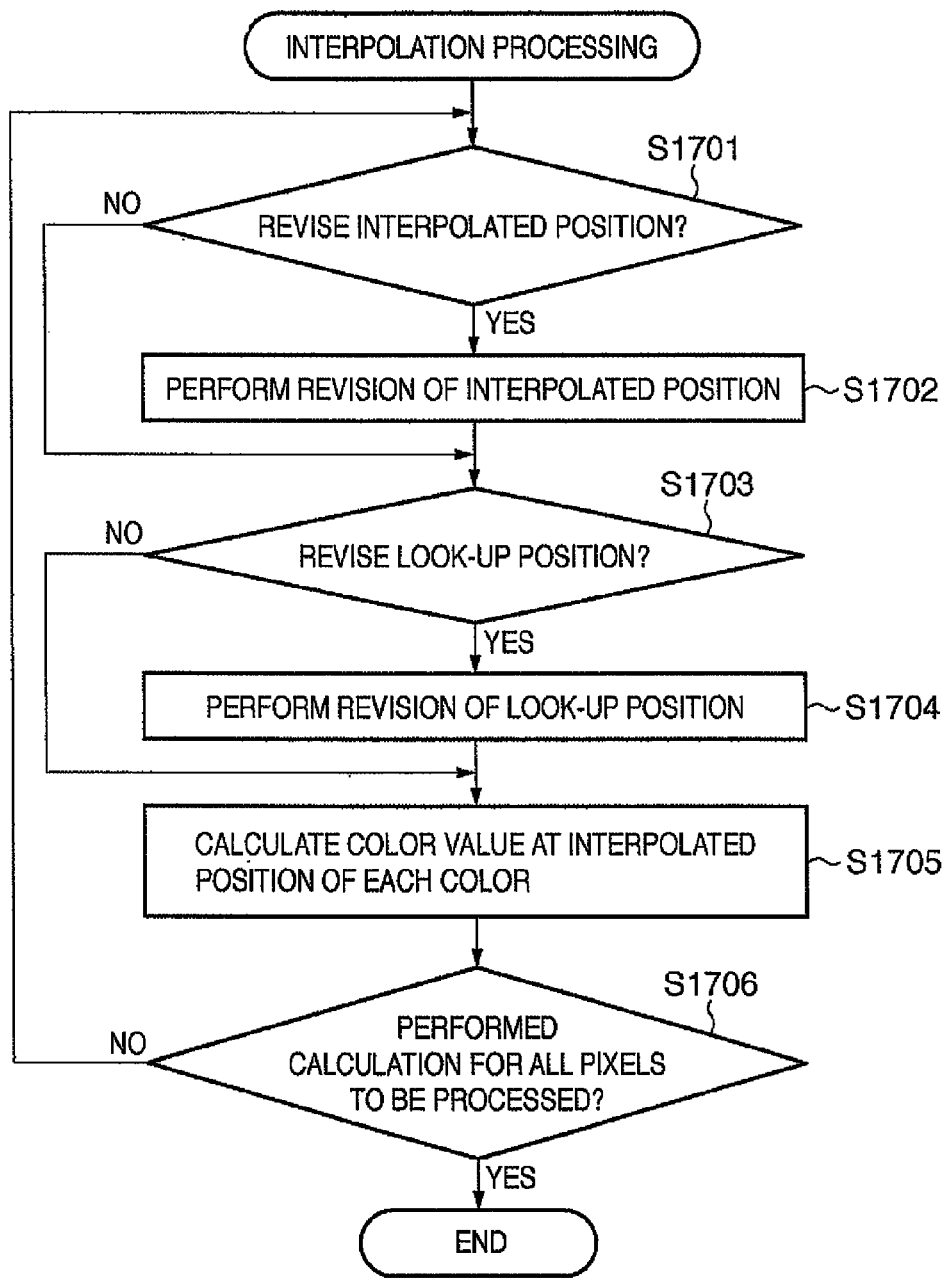

IMAGE PROCESSING APPARATUS AND METHOD, HEAD MOUNTED DISPLAY, PROGRAM, AND RECORDING MEDIUM

BACKGROUND OF THE INVENTION

1. Field of the Invention

The present invention relates to an image processing apparatus and method, Head Mounted Display, program, and recording medium, and more specifically relates to technology for correcting chromatic aberration in a configuration in which the position of primary color elements included in each pixel of a display differs for each color.

2. Description of the Related Art

Recently, so-called MR (Mixed Reality) technology in which real and virtual worlds are merged seamlessly and in real time has become known. In one example of MR technology that is known, using a video see-through HMD, an object being observed from the pupil position of a wearer of the HMD is captured with a video camera or the like, and a mixed reality image in which CG is superimposed on that captured image is displayed to the HMD wearer. HMD is an abbreviation for Head Mounted Display, and CG is an abbreviation for Computer Graphics. With a video see-through HMD, an image of an object is captured using a charge-coupled device such as a CCD to obtain digital image data of the object, and an MR image (mixed reality image) in which a CG image is superimposed is displayed to the wearer via a display device such as a liquid crystal display.

Size and weight reduction are desirable for such an HMD worn on the head. However, when an optical system is configured with inexpensive lenses or few lenses, there is a risk that due to lens aberration, it will not be possible to maintain good image quality for the displayed image. For example, due to lens distortion aberration, a barrel or pin-cushion image may be obtained. Also, due to lens magnification chromatic aberration, color bleeding in red, blue, or green may occur at border portions of the object image. Therefore, it is necessary to correct the above sort of image quality reduction of the object image caused by lens aberration.

Systems of correcting various aberration by an optical approach are generally large in size and weight, and therefore, in many cases, are not appropriate for an HMD application in which reduced size and weight are desired. Therefore, the possibility of allowing the adoption of inexpensive lenses and reducing the number of lenses by implementing electronic correction using signal processing also for the optical system used for capture and display is being investigated.

Technology for using signal processing to correct distortion aberration and magnification chromatic aberration among the various types of aberration of the optical system can be broadly classified into three types. A general description of each of these is given below.

The first type is processing to correct distortion aberration and magnification chromatic aberration using address conversion. Address conversion is a technique in which a distorted image is moved to an ideal image location, based on the corresponding relationship of an imaging position obtained with an ideal optical system and an actual imaging position where there are aberration effects in the capture system. There are various types of address conversion, including converting the corresponding relationship with respect to pixel position before and after conversion to a table, and simply converting the corresponding relationship (address) of memory read out and writing, as well as address conversion that maintains coordinate data after high-accuracy conversion. In the display system as well, the display position is converted according to the corresponding relationship of the pixels displayed and the position where they are actually displayed. Distortion aberration can be corrected by performing such pixel conversion, and magnification chromatic aberration can be corrected when conversion has been performed for each color constituting a pixel.

The second type is processing to correct magnification chromatic aberration using resolution conversion, in which an image with little color bleeding is obtained by applying enlargement or reduction processing to a reference color using a variable magnification that differs depending on the color.

The third type is processing to correct distortion aberration using an approximation polynomial and processing to correct magnification chromatic aberration using distortion aberration correction of each color, in which a set of coordinates after conversion by approximation with a higher order polynomial using correction parameters as coefficients are calculated.

Address conversion has comparatively high versatility, and with address conversion, highly accurate coordinate conversion is possible. However, when image size is large or when high conversion accuracy is sought, the size of a look-up table in which the corresponding relationship with coordinates after conversion is stored will become inflated.

In response, a configuration in which one of a plurality of colors is used as a reference color and the difference between the reference color and other colors is stored; and a configuration in which symmetry of an optical system is used to reduce the size of a table, are disclosed in Japanese Patent Laid-Open No. 8-205181 and Japanese Patent Laid-Open No. 2004-153323. For example, if an optical system is symmetrical in the left-right direction or the up-down direction relative to an image, it is possible to generate a look-up value of a display target portion only for a side in one direction, so the table size can be reduced by half. Furthermore, if the optical system is symmetrical in both the left-right direction and the up-down direction (i.e., a rotationally symmetrical system), the table size can be reduced to one quarter.

However, with the conventional technology as described above, the following sort of problems exist. That is, even if the optical system that leads light from the display device to the pupils is rotationally symmetrical or is symmetrical relative to an axis that passes through an optical origin point, the alignment of pixels that constitute the display device may not be symmetrical relative to an axis in the left-right or up-down direction. For example, a display panel such as a single panel TFT (Thin-Film Transistor) liquid crystal panel or an organic EL panel corresponds to this sort of display device. Such display devices are often adopted in an HMD in order to reduce size and weight.

Each pixel of a TFT liquid crystal panel has, for example, filters of three colors R (red), G (green), and B (blue) as primary color elements that emit light in the primary colors. In a TFT liquid crystal panel in which, when viewing the liquid crystal panel from the front, the filters are disposed in each pixel in this order from left to right, relative to a vertical axis that passes through the optical origin point, B is positioned to the outside on the right side of the liquid crystal panel, and R is positioned to the outside on the left side of the liquid crystal panel. When correction values of rotational symmetry or axial symmetry are applied to such a configuration, displacement occurs in the alignment direction of the pixels. The manner of displacement depends on the optical element that is used, and in a configuration in which each pixel has filters of three colors RGB, for example, the displacement amount of R and B is about ⅔ of a pixel in the left-right direction. Ordinarily, the resolution of the optical system of an HMD often has a resolving power of about 1 pixel, and it has been confirmed in testing that color displacement of about 0.1 to 0.3 pixels is visually apparent as false color or color bleeding.

Accordingly, in a case where elements (such as color filters or light emitting units) that emit each primary color are each separately provided within each pixel as in the above-described TFT liquid crystal panel, when optical aberration is corrected by a conventional technique, false color or color bleeding to an extent perceptible to a user will occur. In particular, in an HMD, the display device is used near the pupils of the user, so color displacement within pixels stands out as reduced image quality.

SUMMARY OF THE INVENTION

The present invention was made in view of the above problems, and aims to provide technology for appropriately correcting optical aberration to display a high quality image, even in a display device in which elements that emit each primary color are separately provided within each pixel.

According to one aspect of the present invention, an image processing apparatus that corrects chromatic aberration that occurs in a display optical system, using a display unit in which respective pixels have a plurality of primary color elements that emit light of respectively differing primary colors, the apparatus includes: an acquisition unit adapted to acquire a displacement amount in which the position of a primary color element used as a light source is used as a reference, for light of each primary color emitted by a primary color element of the display unit; a calculation unit adapted to calculate a display position in the display unit for each primary color component of each pixel in a display image, based on the acquired displacement amount; and a display control unit adapted to display each primary color component of each pixel of the display image at the display position of the display unit calculated by the calculation unit.

According to another aspect of the present invention, an image processing method in an image processing apparatus that corrects chromatic aberration that occurs in a display optical system, using a display unit in which respective pixels have a plurality of primary color elements that emit light of respectively differing primary colors, the method includes the steps of: acquiring a displacement amount in which the position of a primary color element used as a light source is used as a reference, for light of each primary color emitted by a primary color element of the display unit; calculating a display position in the display unit for each primary color component of each pixel in a display image, based on the acquired displacement amount; and displaying each primary color component of each pixel of the display image at the display position of the display unit that has been calculated in the calculating step.

Further features of the present invention will become apparent from the following description of exemplary embodiments (with reference to the attached drawings).

BRIEF DESCRIPTION OF THE DRAWINGS

FIG. 10A shows a principle whereby a correction value stored in an aberration correction table is obtained.

FIG. 10B shows an example of an aberration correction table.

FIGS. 13A, 13B, and 13C are schematic diagrams that show principles of processing to correct a color displacement amount.

FIG. 14A shows a principle whereby a correction value stored in an aberration correction table is obtained.

FIG. 14B shows an example of an aberration correction table.

FIG. 17 is a flowchart that shows the flow of interpolation processing.

DESCRIPTION OF THE EMBODIMENTS

Embodiments of the present invention will now be described in detail with reference to the attached drawings. It should be noted that the constituent elements set forth in these embodiments are only examples, and do not limit the scope of the present invention. Also, any combination of features described in these embodiments is not essential to the invention.

First Embodiment
Apparatus Configuration

Figure 1:
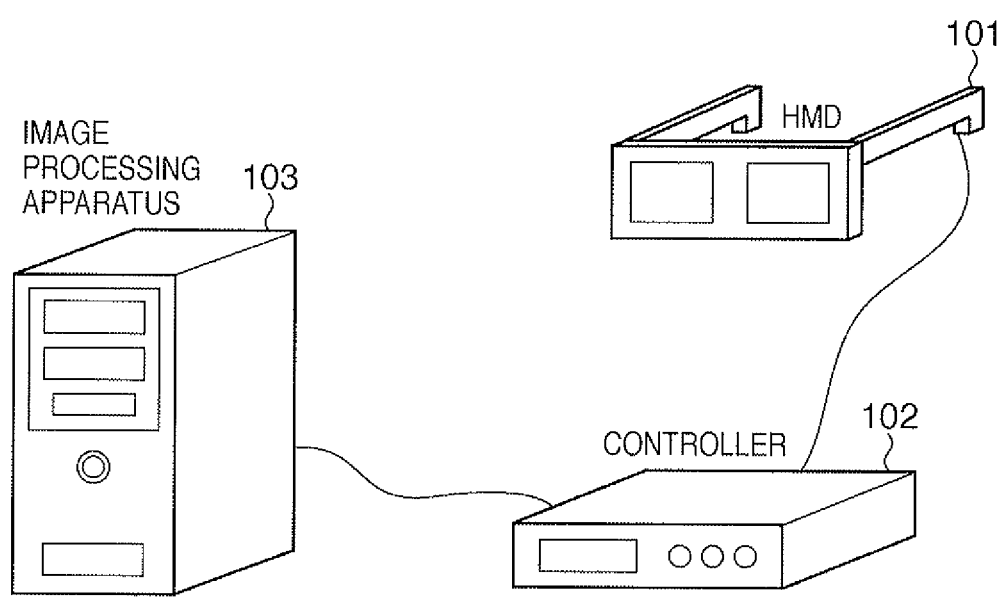
FIG. 1 shows the overall apparatus configuration of an MR system.

A first embodiment of the invention will be described with reference to the drawings. FIG. 1 shows the overall apparatus configuration of an MR system in the first embodiment.

In so-called MR (Mixed Reality) technology in which real and virtual worlds are merged seamlessly and in real time, a display apparatus with capture function (below, a display apparatus with capture function is abbreviated as an HMD (Head Mounted Display), but this is not limited to an apparatus worn on the head, and may also be a hand-held apparatus such as binoculars) is used. In the present embodiment, a CG image generated based on three dimensional position and orientation information such as the position and direction of the wearer is superimposed on a background image of a real space from the viewpoint of the wearer that has been captured by a capture unit of the HMD (Head Mounted Display), and these images are displayed in a display unit of the HMD. Thus, the HMD wearer can have a sensation of mixed reality in which it seems as if an object drawn in CG exists in the real space being observed.

As shown in FIG. 1, the MR system in the present embodiment is provided with an HMD 101, a controller 102, and an image processing apparatus 103.

The HMD 101 has a capture unit that acquires an image of a real space being observed by the wearer, and an image display unit that provides a display image to the wearer. The display image that the image display unit provides to the wearer includes, for example, a captured real space image, an output image from the image processing apparatus 103, or a composite image in which a CG image generated by the image processing apparatus 103 has been superimposed on a real space image. Also, the HMD 101 has a function to perform communications with the controller 102, and is configured so that driving by receiving power supply from the controller 102 as well as driving with a battery are possible.

The image processing apparatus 103 connected to the controller 102 has a CG drawing unit that draws a CG image and an image compositing unit that composites a CG image with a real space image. The image processing apparatus 103 performs communications with the HMD 101 via the controller 102. In the HMD 101, a composite image is received, and this composite image is displayed to the HMD wearer by the image display unit of the HMD 101. The controller 102 is provided with functions such as various image processing like image resolution conversion, color space conversion, and correction of distortion of an optical system, which is a feature of the present embodiment, and transmission format conversion.

In FIG. 1, the image processing apparatus 103 and the controller 102 have separate hardware configurations, but a dedicated image processing apparatus may be configured by gathering the respective functions of the controller 102 and the image processing apparatus 103. Also, in FIG. 1 the respective apparatuses are connected with wired communications lines, but some or all of these may be connected with wireless communications lines. Further, some or all functions of the controller 102 may be incorporated in the HMD 101 side. Below, from the viewpoint of functionality, a configuration is described in which the functions of the controller 102 and the HMD 101 are combined in the HMD 101.

Functional Configuration

Figure 2:
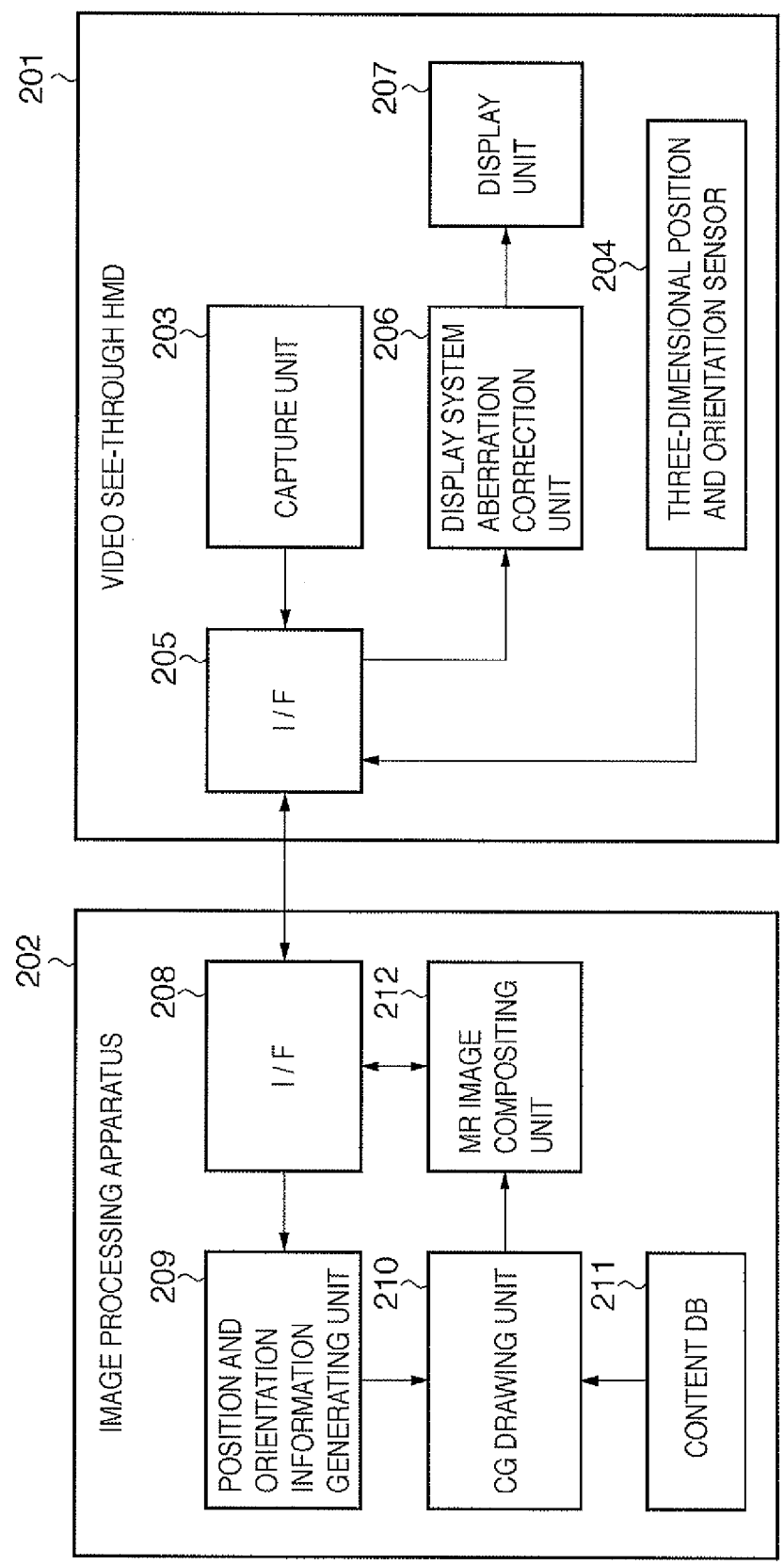
FIG. 2 is a function block diagram of a video see-through mixed reality system.

Next is a description of the functional configuration of the mixed reality system according to the present embodiment, with reference to FIG. 2. FIG. 2 is a function block diagram of a video see-through mixed reality system in the present embodiment.

Reference numeral 201 denotes a video see-through HMD. The HMD 201 is provided with the following components: a capture unit 203 that captures the physical world; a display unit 207 that displays an MR image in which a CG is superimposed; an I/F (interface) 205 with an image processing apparatus 202 that draws and composites a CG; a three-dimensional position and orientation sensor 204 that outputs position and orientation information of the HMD; and a display system aberration correction unit 206 (described below) according to the present embodiment.

Reference numeral 202 denotes an image processing apparatus that generates position and orientation information from a captured image received from the HMD 201, generates a CG image based on that position and orientation information, and composites the CG image with the captured image. This can ordinarily be realized using an apparatus that has high performance computational processing and graphics display functions, such as a personal computer or a workstation.

Reference numeral 203 denotes a capture unit that captures an observation image of the physical world that approximately matches the line-of-sight position of the HMD wearer, and has two groups of capture elements, for the right eye and the left eye, for generating a stereo image, as well as an optical system and a signal processing circuit for performing subsequent image processing. The configuration of the optical system will be described later.

Reference numeral 204 denotes a three-dimensional position and orientation sensor for obtaining position and orientation information of the HMD wearer. A magnetic sensor or gyro sensor (acceleration, angular velocity) is used in the three-dimensional position and orientation sensor 204. Necessary sensor output information is generated by a position and orientation information generating unit 209 described later, but it is not essential to provide this device; position and orientation information may be detected by analyzing a captured image.

Reference numeral 205 denotes an I/F (interface) that transmits an image captured by the capture unit 203 to the image processing apparatus 202, and transmits a composited MR image to the HMD 201. The I/F 205 functions as an interface when performing data communications between the HMD 201 and the image processing apparatus 202, and an I/F 208 provided on the image processing apparatus 202 side also functions in the same manner. It is desirable to adopt communications standards for both the I/F 205 and the I/F 208 such that the interfaces function in real time, and are capable of high-capacity transmission. In the case of a wired system, for example, it is possible to use a USB or IEEE 1394 metal line, or Gigabit Ethernet (registered trademark) optical fiber or the like. In the case of a wireless system, for example, it is possible to use high speed wireless communications compliant with IEEE 802.11 wireless LAN standards or IEEE 802.15 wireless PAN standards, or the like. In this embodiment, optical fiber is assumed in the case of a wired system, and UWB (Ultra Wide Band) is assumed in the case of a wireless system. The optical fiber transmission band is several Gbps, and in the case of UWB is several hundred Mbps. In the future, a milliwave wireless communications method having a band of several Gbps may also be adopted.

Reference numeral 206 denotes a display system aberration correction unit that corrects aberration that occurs in a display optical system. This will be described in detail later.

Reference numeral 207 denotes a display unit for displaying a composited MR image. The display unit 207, like the capture unit 203, has two groups of display devices, for the right eye and the left eye, as well as an optical system. A small liquid crystal display or a retina scanning-type device employing a MEMS (Micro Electro Mechanical System) is used for the display devices. The configuration of the optical system will be described later.

Reference numeral 208 denotes an image processing apparatus side I/F. The configuration of the I/F 208 is the same as that of the I/F 205 within the HMD 201, and so a description of the I/F 208 is omitted.

Reference numeral 209 denotes a position and orientation information generating unit that generates position and orientation information of the HMD wearer from the received image information. The position and orientation information is generated by extracting a marker or a feature point used instead of a marker from a captured image. Even in a case where there is no marker or feature point to be used in the captured image, for example, a captured image from an objective viewpoint that is not shown in the drawings, or information from the three-dimensional position and orientation sensor 204 installed in the HMD 201, may be supplementally used to detect position and orientation.

Reference numeral 210 denotes a CG drawing unit that uses data for respective virtual objects held in a content DB 211 to create a virtual space in which the respective virtual objects are disposed in the virtual space. Also, the CG drawing unit generates an image (CG image) that is viewable from the viewpoint of the observer in the formed virtual space. The details of processing to generate an image of a virtual space that is viewable from a viewpoint having a predetermined position and orientation is well known, so a description of that processing is omitted.

Reference numeral 211 denotes a content DB (database), in which virtual image content is stored and which holds data relating to the virtual objects that constitute the virtual space. The data relating to a virtual object includes, for example, data that indicates the disposed position and orientation of the virtual object and operating rules of the virtual object. Also, when the virtual object is configured using polygons, the data for the virtual object also includes normal vector data and color data for each polygon, as well as coordinate position data of each apex point that constitutes a polygon, and so forth. Furthermore, when texture mapping is performed on the virtual object, texture data is also included.

Reference numeral 212 denotes an MR image compositing unit that composites a captured image drawn as a background image and a CG image. The MR image obtained here is sent to the HMD 201 via the I/F 208 and used for display.

The flow of processing employing the above configuration is as follows. That is, a captured image that has been obtained by the capture unit 203 is sent to the image processing apparatus 202 via the I/F 206. In the image processing apparatus 202, based on an identifying marker or other feature amount within the received captured image, position and orientation information of the HMD 201 is calculated. Afterward, using the captured image as a background image, a CG image that has been generated based on that position and orientation information is superimposed, and thus an MR image that is a composite image is generated. The composited MR image is sent to the HMD 201 via the I/F 208. In the HMD 201, aberration of the display optical system is corrected by the display system aberration correction unit 206 in the same manner as aberration of the capture system, and displayed by the display unit 207. With the above configuration and processing processes, it is possible to obtain an MR image that is a display image in which aberration has been corrected, and possible to lead a high-quality image to the pupils of a user.

Hardware Configuration of Image Processing Apparatus

Figure 3:
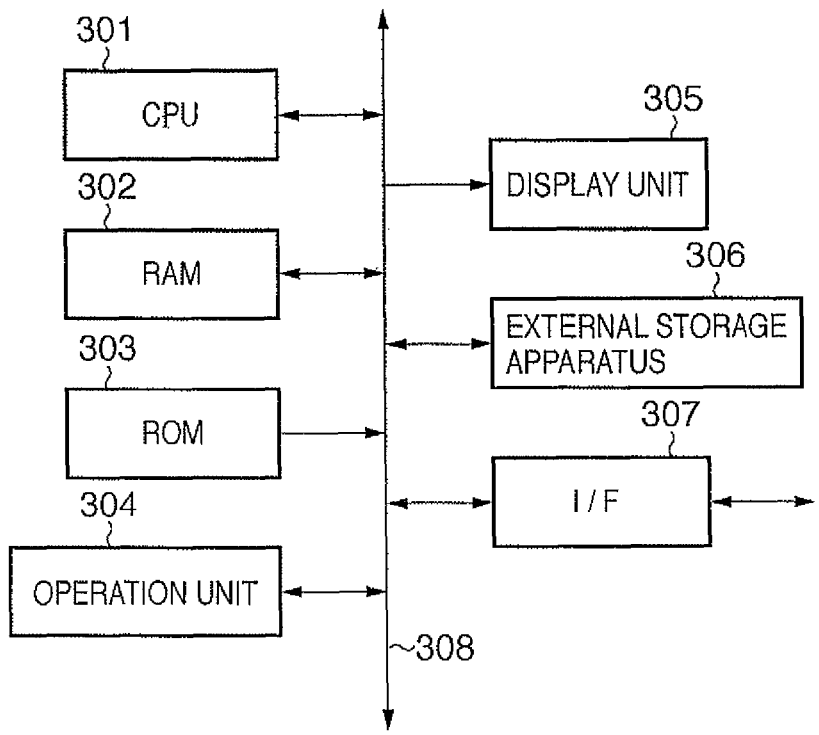
FIG. 3 is a block diagram that shows the hardware configuration of a computer that is applicable to an image processing apparatus.

FIG. 3 is a block diagram that shows the hardware configuration of a computer that is applicable to an image processing apparatus.

Reference numeral 301 denotes a CPU that uses programs and data stored in a RAM 302 and a ROM 303 to perform overall control of a computer, and to execute processing performed by the image processing apparatus 202 in which this computer is applied.

Reference numeral 302 denotes a RAM (writable memory). The RAM 302 has an area for temporarily storing programs or data that have been loaded from an external storage apparatus 306, data received from outside (the HMD 201 in the case of this embodiment) via an I/F 307, and so forth. The RAM 302 also has a work area used by the CPU 301 when executing various processing. The RAM 302 can supply various areas as appropriate.

Reference numeral 303 denotes a ROM (read-only memory) that stores setting data, boot programs, and so forth of this computer. Reference numeral 304 denotes an operation unit that is configured from a keyboard, a mouse, and so forth. By operating the operation unit 304, an operator of this computer can input various instructions to the CPU 301.

Reference numeral 305 denotes a display unit that is configured from a CRT, a liquid crystal screen, or the like. The display unit 305 can display results of processing by the CPU 301 or a graphics board not shown in the drawings to the operator as images or text.

Reference numeral 306 denotes an external storage apparatus that can be realized with a high capacity information storage apparatus, typified by a hard disk drive apparatus. Here, an OS (operating system), and programs and data for allowing the CPU 301 to execute various processing described later that is performed by the image processing apparatus 202, are saved in the external storage apparatus 306. According to control by the CPU 301, these programs and data are loaded into the RAM 302 as appropriate, and become subjects of processing by the CPU 301.

Reference numeral 307 denotes an I/F that corresponds to the I/F 208 shown in FIG. 2. The I/F 307 functions as an interface for performing data communications with the HMD 201. Reference numeral 308 denotes a bus that joins the parts described above.

Note that software that realizes the same functions as the above apparatuses can be substituted for a hardware configuration.

Also, in the present embodiment, for convenience of description, a configuration is described in which a computer is realized with a computer as one apparatus, but a computer may also be realized with a configuration in which resources are distributed to a plurality of apparatuses. For example, a configuration may be adopted in which storage or computational resources are distributed to a plurality of apparatuses. Alternatively, with resources distributed for each constituent element that is virtually realized in a computer, parallel processing may be performed.

Hardware Configuration of HMD

Figure 4:
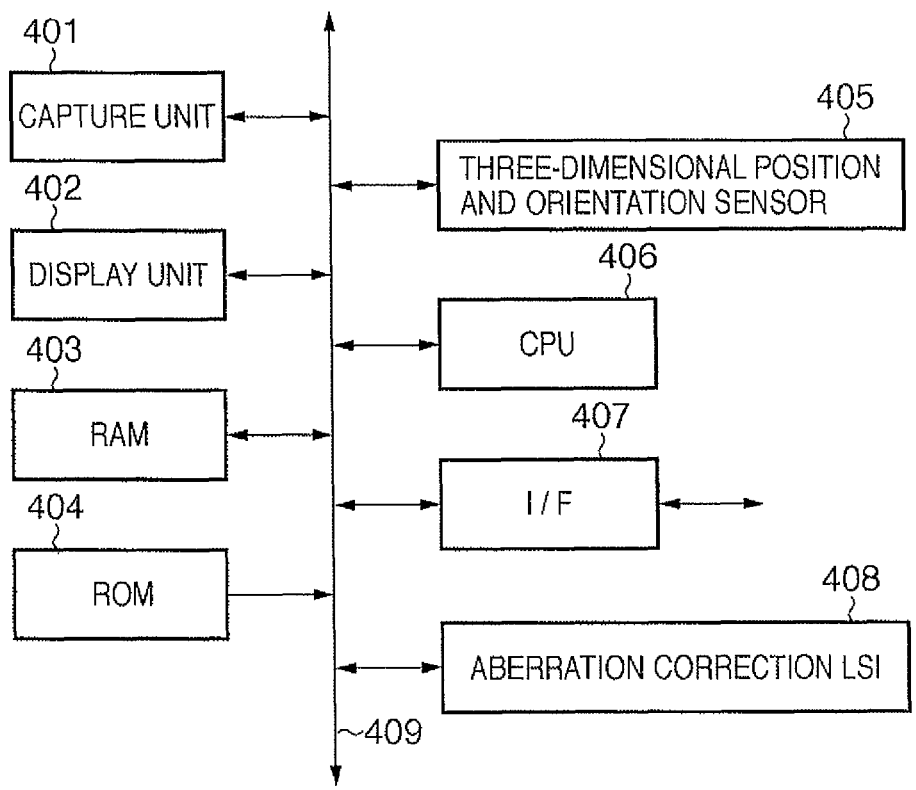
FIG. 4 is a block diagram that shows the hardware configuration of an HMD.

FIG. 4 is a block diagram that shows the hardware configuration of the HMD. Reference numeral 401 denotes a capture unit that corresponds to the capture unit 203, and reference numeral 402 denotes a display unit that corresponds to the display unit 207. Reference numeral 403 denotes a RAM that has a work area used by a CPU 406 in order to perform various processing, an area for temporarily storing data received from outside (here, the image processing apparatus 202) via the I/F 205, and so forth.

Reference numeral 404 denotes a RAM in which programs and data for allowing the CPU 406 to execute various processing described later that is performed by the HMD 201 are stored. Reference numeral 405 denotes a three-dimensional position and orientation sensor that corresponds to the three-dimensional position and orientation sensor 204. Reference numeral 406 denotes a CPU that performs initial settings of the HMD 201, and executes a program that performs control of various devices. Reference numeral 407 denotes an I/F that corresponds to the I/F 205 shown in FIG. 2. A bus 409 joins the parts described above.

Reference numeral 408 denotes an aberration correction LSI that corresponds to the display system aberration correction unit 206. Here, an ASIC that is a dedicated integrated circuit is assumed, but a configuration may also be adopted in which a function is described and realized in software by a DSP that is a signal processing processor. The content of processing will be described in detail later.

Aberration

Figure 5A:
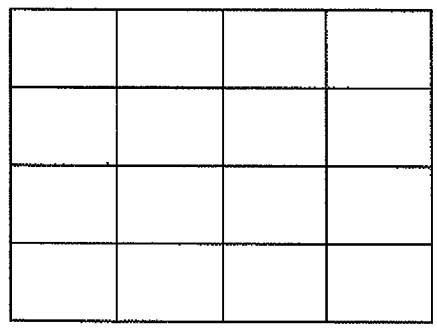
FIGS. 5A, 5B, and 5C illustrate distortion aberration and magnification chromatic aberration.
Figure 5B:
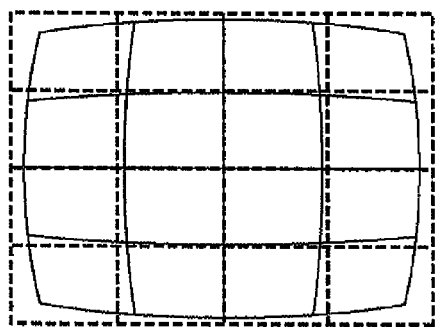
Figure 5C:
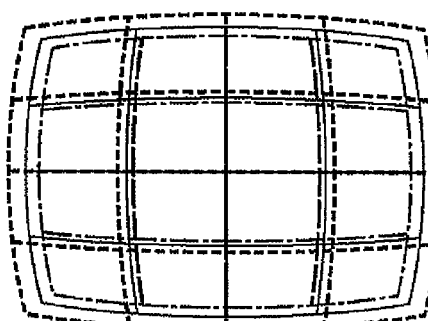

Next is a description of aberration that occurs in the optical system, with reference to FIGS. 5A, 5B, and 5C. FIGS. 5A, 5B, and 5C illustrate distortion aberration and magnification chromatic aberration. FIG. 5A shows a state in which there is no distortion, FIG. 5B shows a state in which there is distortion, and FIG. 5C shows a state in which magnification chromatic aberration has occurred in addition to distortion aberration.

When imaging is performed using an actual lens, in the case of capturing a graphic like that in FIG. 5A, the image distorts as shown in FIG. 5B. Such image distortion that occurs due to the shape of the lens in this way regardless of whether or not the display image is a single color is referred to as distortion aberration.

On the other hand, the refractive index of a light ray differs depending on the wavelength of the light ray, and thus the enlargement magnification of an image differs for each primary color, so a phenomenon occurs in which the imaging position (magnification) differs in the display device by color. Such optical aberration that occurs due to image enlargement magnification differing by color is referred to as magnification chromatic aberration.

FIG. 5C schematically shows how magnification chromatic aberration occurs. In FIG. 5C, among the three primary colors RGB, Green is indicated by a solid line, Red is indicated by a broken line, and Blue is indicated by a single dotted chained line. Here, because Red, Green, and Blue light rays respectively have different wavelengths, the refractive index in the lens also differs between the light rays of each color. Accordingly, as shown in FIG. 5C, a Red image is formed to the outside relative to a Green image, and a Blue image is formed to the inside relative to the Green image. Therefore, for example, in the case of a monochrome object, color bleeding (color displacement) occurs at the edges of that image. In the case of a color image object, the same color bleeding occurs at edge portions where the color changes, such as in border regions.

Display Optical System

Figure 6:
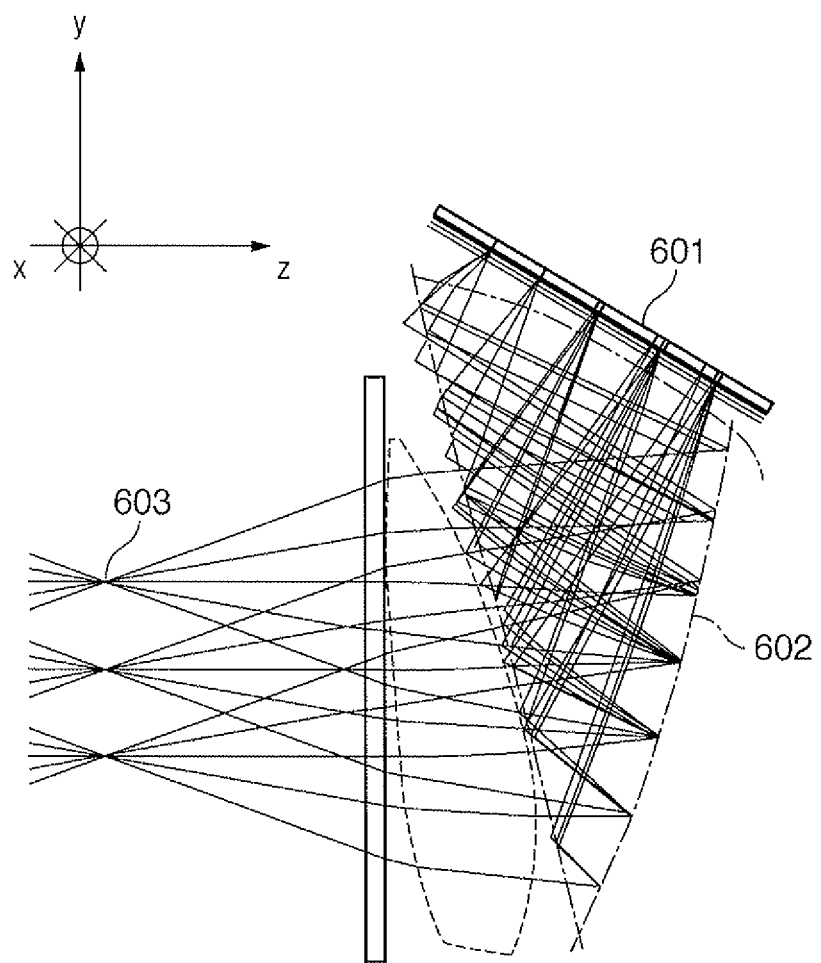
FIG. 6 shows an example of a display optical system.

Next is a description of the display optical system, with reference to FIG. 6. FIG. 6 shows an example of the display optical system.

Reference numeral 601 denotes a display panel that is a TFT liquid crystal or organic EL device having a pixel configuration described later. In the case of a TFT liquid crystal panel, the display panel 601 has a configuration in which a backlight not shown in the drawings is used as a light source to illuminate with light via filters of each color. In the case of an organic EL device, a backlight is not necessary because the organic EL device itself emits light. A color image shown to a user is formed on this panel.

Reference numeral 602 denotes a prism with a free-form surface that is for enlarging light rays from the small display panel 601 and leading those light rays to the pupils. With the prism 602, it is possible to realize a thinner and smaller shape than with a simple lens.

Reference numeral 603 denotes an imaging point 603 of an image formed by the display panel 601. By bringing the pupils to this position, it is possible to view a large screen display image in which the image of the display panel 601 has been enlarged.

Ordinarily, the effects of various types of aberration that occur in an optical system are suppressed by a plurality of lens groups, but simplification and reduced size and weight of the optical system are essential for realization of a small HMD. To achieve this, it is useful to design a coordinated system in which the effects of aberration other than magnification chromatic aberration are suppressed as much as possible, and magnification chromatic aberration is electronically corrected.

Configuration of Display Device

Figure 7:
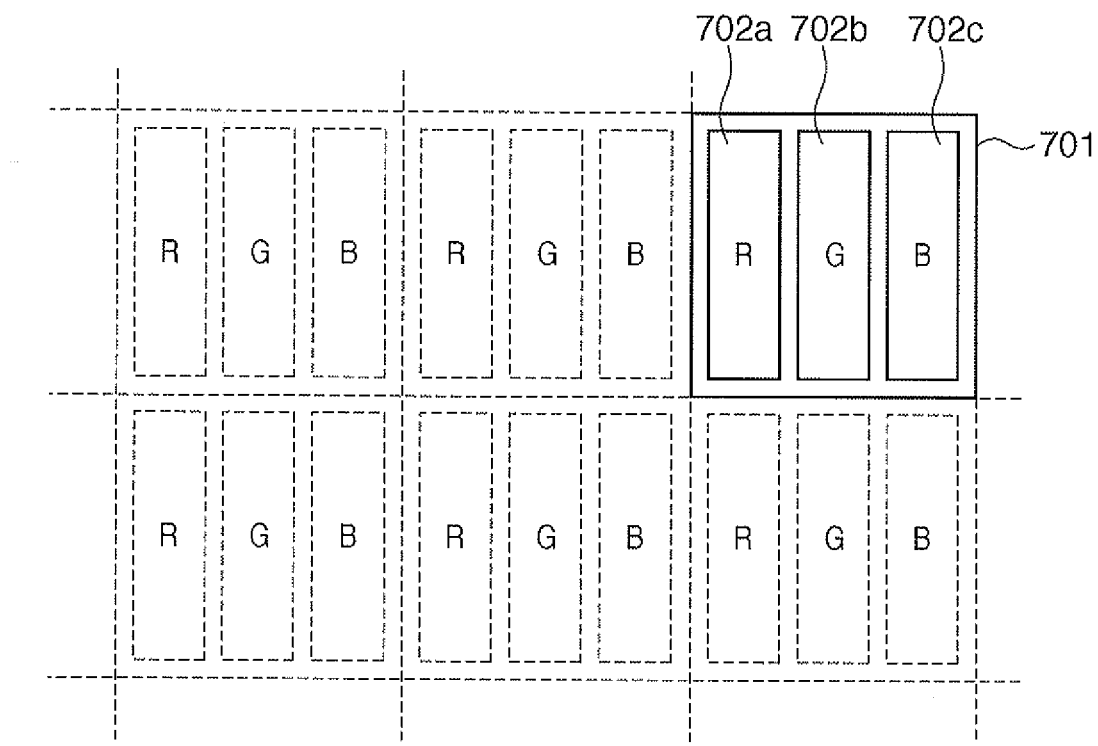
FIG. 7 is a schematic diagram that shows the pixel configuration of a display device.

FIG. 7 is a schematic diagram of the pixel configuration of the display device. FIG. 7 schematically shows a front view in which part of the display panel 601 shown in FIG. 6 is enlarged.

Reference numeral 701 denotes a pixel 701 that has filters of a plurality of colors (three colors in this embodiment) described later. Here, the pixel 701 functions as a physical unit in which tone is expressed based on information of each color RGB.

Color filters 702a, 702b, and 702c serve as primary color elements that emit primary color light and are included in the one pixel 701, and have the respective colors R (red), G (green), and B (blue). As shown in FIG. 7, the filter configuration within each pixel 701 is the same, and in the example shown in FIG. 7, each of the colors RGB are disposed repeatedly and regularly in the horizontal direction. Where each pixel is a square and the length of one side is 3d, the distance between respective filters (distance between the center position of respective filters) is d.

Here, an example configuration of a pixel having the three primary colors RGB is described, but the combination of colors that constitute the pixel is not limited to RGB. Also, a complementary color configuration, or a configuration with more than three colors in which there are colors in addition to RGB, or a configuration with fewer colors than RGB (for example, a configuration reduced by one color so that there are two colors), may be adopted. Also, in this embodiment, an example is described in which the primary color elements that emit primary color light are realized with color filters, but a primary color element may also be realized using a device other than a color filter.

Display System Aberration Correction Unit

Figure 8:
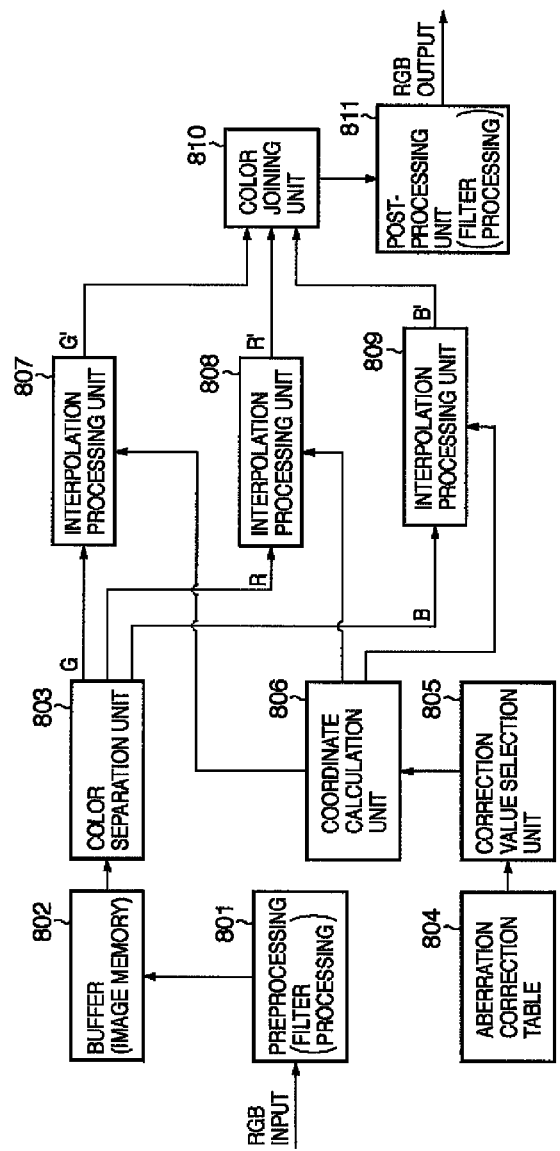
FIG. 8 is a block diagram that shows the functional configuration of a display system aberration correction unit.

FIG. 8 is a block diagram that shows the functional configuration of the above display system aberration correction unit 206.

Reference numeral 801 denotes a preprocessing unit. Processing for aberration correction itself can be considered as resolution conversion processing that accompanies deformation, so there may be cases when part of the processing is reduction processing in which there is almost no size change. The preprocessing unit 801 uses a low-pass filter to execute processing that removes a harmonic component in order to reduce the effects of aliasing.

Reference numeral 802 denotes a buffer that stores image data having pixels that have RGB color components.

Reference numeral 803 denotes a color separation unit that reads out values of a pixel at desired coordinates (an address) from the buffer 802, and separates these values into RGB color components. When input includes brightness and color difference signals, processing in which the pixel is reconfigured in the respective color components is performed as preprocessing.

Reference numeral 804 denotes an aberration correction table. The aberration correction table 804 stores values for calculating coordinate values after conversion that correspond to the coordinates of a look-up point. In the present embodiment, the concept of a base point is adopted in order to calculate the coordinate values after conversion. Details of the configuration of the table and the values stored in the table will be described later.

Reference numeral 805 denotes a correction value selection unit that selects a correction value of each color. The correction value selection unit 805 determines the look-up point of a pixel to be displayed, and reads out the coordinates where the look-up point is to be converted from the aberration correction table 804, which is a look-up table. With the correction value selection unit 805, correction values for calculating the conversion coordinates that correspond to the coordinates of the look-up point are read out.

Reference numeral 806 denotes a coordinate calculation unit that calculates coordinates of each color after conversion, based on the correction values selected with the correction value selection unit 805. The aberration correction table 804 stores coordinates after conversion for a designated color for capacity reduction, and stores a difference using this designated color as a reference for colors except for the designated color. With the coordinate calculation unit 806, the coordinates after conversion of this other color are calculated from difference values relative to the coordinates of a reference color.

Reference numerals 807, 808, and 809 denote interpolation processing units that calculate respective new color values at an interpolated position based on the respective color values of coordinates after conversion and a reference pixel. The interpolation processing unit 807 calculates a new value for Green, the interpolation processing unit 808 calculates a new value for Red, and the interpolation processing unit 809 calculates a new value for Blue. The interpolated positions are actual pixel positions on the display panel.

Reference numeral 810 denotes a color joining unit that joins color information in a display pixel based on the new color values at the interpolated positions respectively obtained by the interpolation processing units 807 to 809. For example, when there is input data with 8 bits per color, input of 8 bits for each color is output as pixel data with a total of 24 bits by joining the pixels after conversion.

Reference numeral 811 denotes a post-processing unit that executes various image processing such as emphasis processing or color correction using a filter.

Principles of Displacement Amount Calculation

Figure 9A:
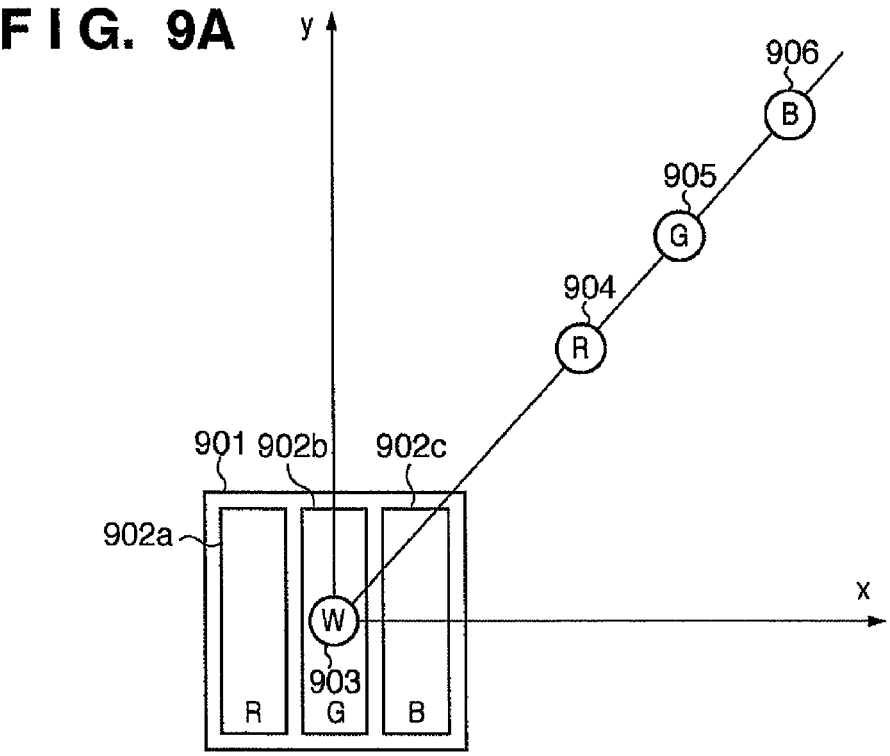
FIGS. 9A and 9B are principle diagrams that show a base point position when calculating a displacement amount.
Figure 9B:
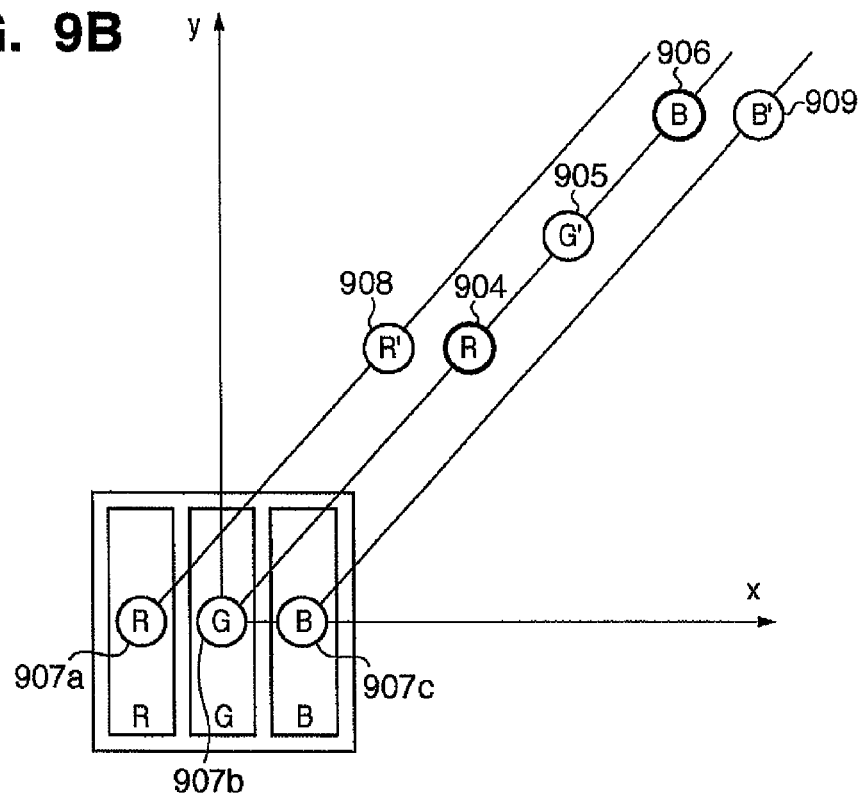

Next is a description of principles of processing to calculate a displacement amount, with reference to FIGS. 9A and 9B. FIGS. 9A and 9B are principle diagrams that show a base point position when calculating a displacement amount.

FIG. 9A shows a principle of conventional displacement amount calculation. Also in the example in FIG. 9A, a pixel 901 has portions R (red) 902a, G (green) 902b, and B (blue) 902c. In FIG. 9A, the base point position of emitted light in the pixel 901 is at the center position of the pixel. A white position W 903 where the three primary colors RGB are mixed is the base point of emitted light, and positions R 904, G 905, and B 906 respectively are positions where displaced display occurs due to the effects of aberration of the optical system. In a conventional configuration, color displacement is assumed with a model in which, as shown in FIG. 9A, the pixel position is approximated by the position G 902b, and the positions W 903, R 904, G 905, and B 906 are disposed on a straight line. In other words, color displacement is approximated with a model in which the position G 902b is the origin point, and R, G, and B are displaced in the same direction. Also, conventionally, displacement amounts at these positions W 903, R 904, G 905, and B 906 are stored in a look-up table as correction values. This displacement amount is an amount that indicates the positions R 904, G 905, and B 906 relative to the base point position 903, and for example, can be indicated with the distance between coordinates in the horizontal direction and/or the vertical direction, or with the distance between two points.

Note that here, displacement occurs at the positions 904 to 906 when light has been emitted at the base point W 903, but it can also be said that the position W 903 is the position where each color arrives at the eyes in a case where light of each color has been emitted at the positions 904 to 906. Actually, the number of bits of the parameters stored in the table has been reduced by using the difference between the position 905 of the color G after conversion and the base point 903 as a correction value. The amount of information to be stored in the table has been further reduced by storing the value of the difference from the position G 905 for the positions R 904 and B 906.

On the other hand, in the present embodiment, for the light of each primary color emitted by the primary color elements, a displacement amount is acquired using the position of the primary color elements serving as light sources as a reference, and the display position in the display device of each pixel of a display image is calculated for each primary color component. Then, display control is performed so as to display pixels of the display image at that display position. Therefore, with the configuration of the present embodiment, it is possible to appropriately correct optical aberration even in a display device in which elements that emit each primary color are separately provided within each pixel. Accordingly, it is possible to reduce color displacement within pixels in a circumstance where a display device is used near the pupils of the user, as in the case of an HMD, for example.

FIG. 9B shows principles of displacement calculation in the present embodiment. As shown in FIG. 9B, in the present embodiment, unlike in the conventional technology, the base point of emitted light is not in the center of the pixel but in the center of each color. That is, the R base point is at an, R emitted light position 907a that is shifted by ⅓ pixel to the left (the negative direction on the X axis) from the conventional base point W 903. Likewise, the B base point is at a B emitted light position 907c that is shifted by ⅓ pixel to the right (the positive direction on the X axis) from the conventional base point W 903. As a result, the position of the color R after conversion moves from the conventional converted position 904 to a position 908. Likewise, the position of the color B after conversion moves from the conventional converted position 906 to a position 909. This amount of displacement actually affects image quality, so it is possible to further increase the image quality of the corrected image by setting base points as shown in FIG. 9B.

Aberration Correction Table

Next is a description of the aberration correction table 804 (also referred to as simply the correction table) with reference to FIGS. 10A and 10B. FIG. 10A illustrates principles for obtaining correction values stored in the aberration correction table, and FIG. 10B shows an example of an aberration correction table.

As shown in FIG. 10B, an address of a look-up position; which is made up of pre-conversion coordinates, and a difference value of coordinates (an address) after conversion are stored together in the aberration correction table 804. By designating the X-Y coordinates of a desired pixel with an address to be looked up, it is possible to obtain the coordinates after conversion for a reference color (G in the present embodiment), and the value (value stored in the table) of the difference from the reference color for the colors (R and B) other than the reference color. As shown in FIG. 10A, the coordinates of R can be obtained from a stored difference value 1001 (Gx−Rx) from G and an X coordinate Gx of G after conversion, and the coordinates of B can be obtained from a stored difference value 1002 (Bx−Gx) from G and the same X coordinate Gx of G.

In this way, in the present embodiment, with respect to a predetermined reference primary color element in each pixel of the display device, the displacement amount of the primary color light emitted by that reference primary color element is acquired as a reference displacement amount. Also, for each primary color element other than the reference primary color element included in a pixel, a displacement amount is acquired based on the relative position of that primary color element relative to the reference primary color element and the reference displacement amount. Therefore, with the configuration of the present embodiment, it is possible to acquire a displacement amount with simpler processing than in the case of acquiring a displacement amount individually for each of the primary color elements included in the display device.

Also, in the present embodiment, this reference displacement amount is stored in advance in the aberration correction table 804 in a storage apparatus such as the external storage apparatus 306, and the reference displacement amount is acquired by reading out from that storage apparatus. Therefore, when necessary, it is possible to easily acquire the reference displacement amount by referring to the aberration correction table 804.

As shown in FIG. 10B, in the present embodiment coordinates prior to conversion are also stored in the table, and the coordinates prior to conversion may be associated with an address when memory access is performed. In this case, a memory region for coordinates prior to conversion is not necessary, so the memory size can be further reduced.

Coordinate Conversion Processing

Figure 11:
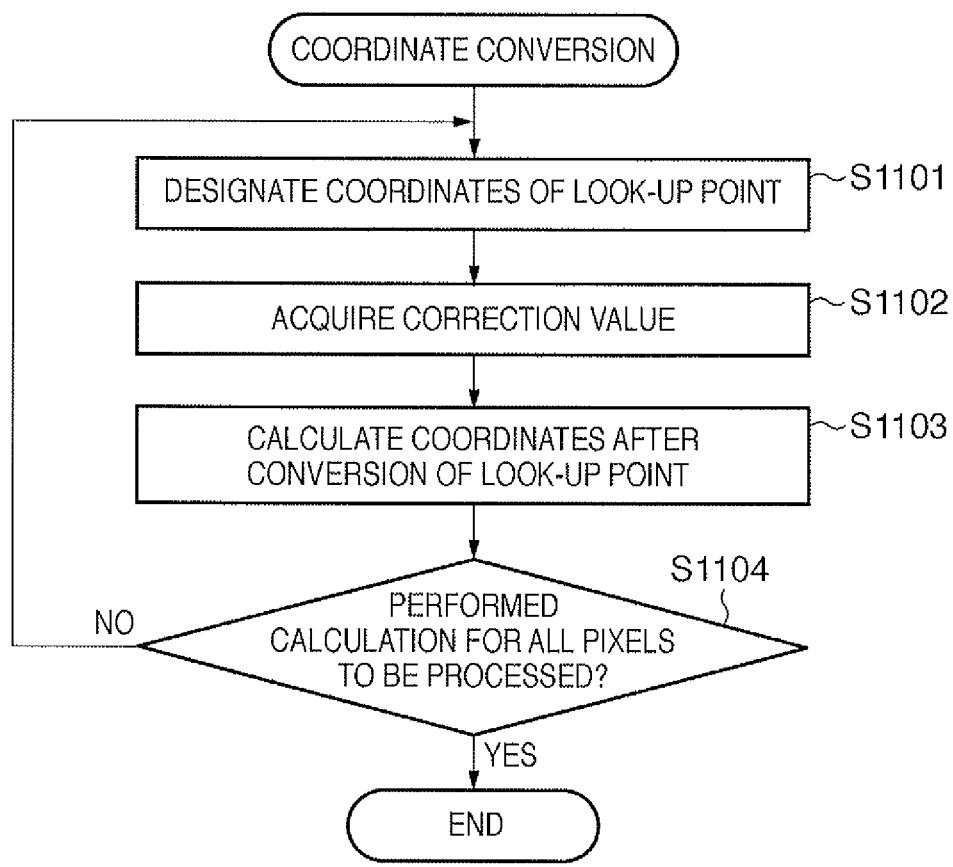
FIG. 11 is a flowchart that shows the flow of coordinate conversion processing.

Next is a description of coordinate conversion processing executed by the display system aberration correction unit 206 with reference to FIG. 11. FIG. 11 is a flowchart that shows the flow of coordinate conversion processing. In the present embodiment, the processing of respective Steps S1101 to S1103 is executed for all of the pixels of an image to be processed.

First, in Step S1101, the coordinates of a look-up pixel in the image to be processed are designated. This designation of coordinates may also be performed by designating an address as described above.

Next, in Step S1102, in order to obtain an address after conversion of the look-up point, a correction value corresponding to this look-up point is acquired from the aberration correction table 804.

Next, in Step S1103, based on the values stored in the aberration correction table 804 that were obtained in Step S1102, that is, based on the amount of color displacement used to calculate the coordinates after conversion of each color, the coordinates after conversion of each color in the look-up pixel are calculated. Specifically, the converted coordinates are calculated by adding the correction value acquired in Step S1102 to the coordinate values of each color prior to correction. For example, in the case of the aberration correction table 804 shown in FIG. 10B, where the coordinates prior to conversion of a pixel to be processed are (xn, yn), the coordinates of G after correction are (Gxn, Gyn). The coordinates of R are Obtained by subtracting the R table value from (Gxn, Gyn), and the coordinates of B are obtained by adding the B table value to (Gxn, Gyn).

In Step S1104, a judgment is made of whether or not the above coordinate conversion processing has been executed for all pixels to be processed. If processing for all pixels has ended, the coordinate conversion processing is ended. If processing for all pixels has not ended, the routine returns to Step S1101, and coordinate conversion calculation in order to correct aberration of corresponding pixels is repeatedly executed.

As described above, in the present embodiment, when using signal processing to correct distortion aberration and chromatic aberration caused by the optical system, the base point position for prescribing the amount of color displacement is not the position of the pixel, but rather is the position of each primary color element that constitutes the pixel, for light of each primary color. Therefore, the accuracy of displacement in coordinate conversion is increased, and as a result it is possible to achieve increased image quality.

In particular, due to a Head Mounted Display (HMD) having a configuration that performs this sort of image processing, it is possible to reduce false color, color bleeding, and so forth even when the display device is near the pupils of the user and so the viewing angle is large.

Second Embodiment

Next is a description of a second embodiment of the present invention with reference to the drawings. In the first embodiment, the accuracy of displacement correction using coordinate conversion was increased by moving the base point for prescribing the amount of color displacement from the center of the pixel to the center of each color constituting the pixel. On the other hand, in the present embodiment, although the center of the pixel is used as the base point as in a conventional configuration, a further reduction in the correction table size is realized while maintaining the same conversion accuracy as in the first embodiment.

Display System Aberration Correction Unit

Figure 12:
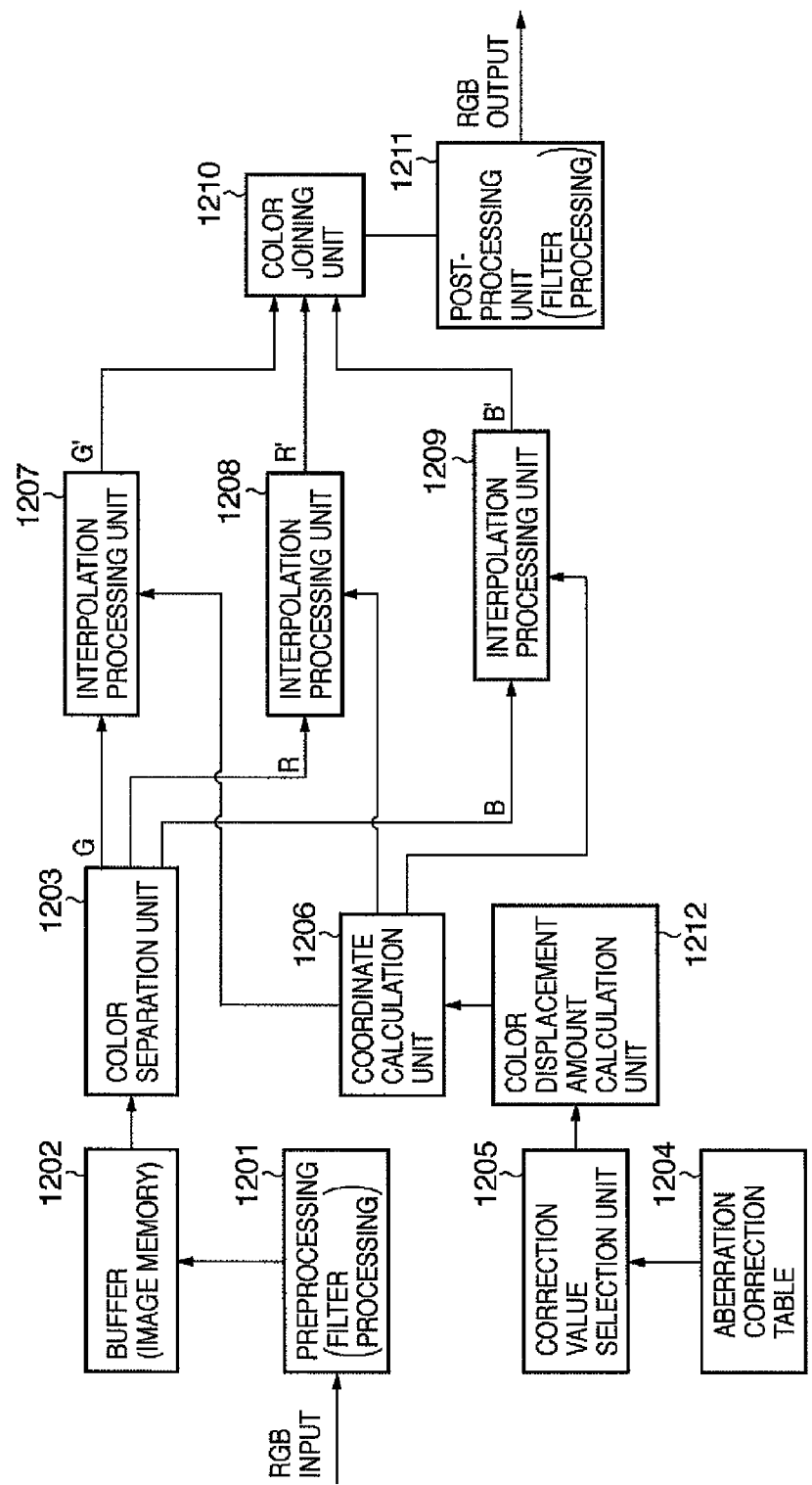
FIG. 12 is a block diagram of a display system aberration correction unit.

FIG. 12 is a block diagram of a display system aberration correction unit 206 in the second embodiment. This embodiment differs from the configuration of the first embodiment by having a color displacement amount calculation unit 1212 in addition to the configuration shown in FIG. 8 referred to in the first embodiment. A description is omitted for aspects of the configuration that are the same as in FIG. 8 of the first embodiment, and for blocks having the same functions (1201 to 1211). Like the first embodiment, this embodiment is directed to a display optical system, and pixels of a display panel have a plurality of colors.

Reference numeral 1212 denotes a color displacement amount calculation unit. In the present embodiment, the size of correction values stored in an aberration correction table 1204 is reduced by considering the optical system to be a symmetrical system, and the color displacement amount calculation unit 1212 executes processing that applies this correction value to a non-symmetrical system. In the present embodiment, a symmetrical system means a rotationally symmetrical system in which even if the optical system is rotated by an arbitrary angle using the center of the optical system as an axis, optical aberration and so forth will occur in the same manner. In this case, this optical system is of course also symmetrical relative to a vertical axis and a horizontal axis. The principles of processing, the configuration of the aberration correction table, and the flow of processing will be described later.

Principles of Displacement Amount Calculation

FIGS. 13A, 13B, and 13C are schematic diagrams that show principles of color displacement amount correction processing. FIG. 13A shows the relationship between an optical origin point O and pixels P1 and P2 on a panel. Here, the optical system is symmetrical relative to a vertical axis (y) that passes through the optical origin point O. P1 and P2 are pixels that are symmetrical relative to the y axis, and distances x1 and x2 of the pixels P1 and P2 from the optical origin point O in the x axis direction are symmetrical relative to the y axis. A distance y1 in the y axis direction is common to both pixels P1 and P2.

Ordinarily, when the pixel configuration is symmetrical relative to an axis and when it is not a problem to consider the pixel configuration to be symmetrical, it is possible to have a look-up table for the right half or the left half relative to the y axis, and also apply that table to the opposite side in a mirrored manner. However, in an enlarging optical system such as an HMD, ordinarily, the distance from the display device to the pupils of the user is short, so the display angle of view is comparatively large, and accordingly, often the number of pixels of the display device is inadequate. For example, even when using a display device with 1920×1080 pixels, color displacement may become conspicuous. Therefore, with image correction by signal processing, that is, aberration correction processing by address conversion, in order to prevent the user from being able to perceive color displacement, it is necessary to generate and store correction values set in consideration of the arrangement of color filters that constitute a pixel. In the present embodiment, as in FIG. 7 referred to in the first embodiment, the color filters RGB in a pixel are arranged in order R, G, B starting from the left.

Therefore, in the present embodiment, when the display optical system has a shape that is symmetrical relative to the center of the display optical system, a reference displacement amount for each pixel included in a reference quadrant of the display device is stored in the aberration correction table 804. Also, for each reference primary color element included in a pixel that is not included in the reference quadrant, a displacement amount is acquired based on the relative position of the quadrant that includes that pixel relative to the reference quadrant, and the reference displacement amount of a pixel corresponding to that pixel of the reference quadrant. Also, for each primary color element other than the reference primary color element included in a pixel that is not included in the reference quadrant, in addition to these pieces of information, a displacement amount is acquired based on the relative position relative to the reference primary color element of that primary color. By using the fact that the shape of the display optical system is symmetrical in this way, it is possible to reduce the amount of data to be stored in the aberration correction table 804.

FIGS. 13B and 13C are schematic diagrams that show, in the configuration illustrated in FIG. 13A, principles for realizing about the same degree of coordinate conversion accuracy as in a configuration considering the arrangement of colors. In FIG. 13B, the pixel P1 is positioned in the right half relative to an axis that passes through the optical origin point O. In the first embodiment, a displacement amount was prescribed for R and B using the center of each color as a base point. In that case, even in the case of optical symmetry relative to the y axis, as indicated by the pixel P2 in FIG. 13C, the arrangement of colors within the pixel is not symmetrical from left to right, so it is necessary to have correction values for all of the pixels in the screen.

On the other hand, in the present embodiment, a position at which displacement from the base point R has occurred is approximated as a position R". R" is a value shifted in the R direction viewed from G (the left direction relative to the x axis), by an amount dx that is the distance between colors constituting the pixel, from the R position to be converted by an ordinary aberration correction method using G, which is in the center of the pixel, as a base point. Likewise, B" is a value shifted in the B direction viewed from G (the right direction relative to the x axis), by an amount dx from B. If the proper position after conversion is R, then it is necessary for the position of R to be used as the base point, but because the distance dx between R and G is sufficiently small relative to the distance from the optical origin point O to R, the error can be ignored. In a region where the distance of R from the optical origin point is short (in the center part of the image), the distance between R and the optical origin point is short, and the displacement amount itself is also relatively small, so an error can be ignored. The same sort of thinking is also applied with respect to the pixel P2, but because the pixel P2 is on the left side relative to the symmetry axis (the y axis), attention is paid to the fact that the direction of shift differs depending on the color.

Even in the case of an ordinary look-up table that has a correction value in which the pixel center is used as the base point in this way, by appropriately performing revision of the conversion coordinate position in consideration of the arrangement of colors within the pixel, it is possible to reduce memory capacity at the same time as increasing image quality.

Aberration Correction Table

Next is a description of the aberration correction table 804 (also referred to as simply the correction table) in the present embodiment, with reference to FIGS. 14A and 14B. FIG. 14A shows a principle whereby a correction value stored in the aberration correction table is obtained, and FIG. 14B shows an example of the aberration correction table.

FIG. 14A is a schematic diagram that shows what position is used as a base point when obtaining the difference value for each color stored in the aberration correction table. The respective displacement amounts in the x direction for the colors RGB after conversion using the color G in the center of the pixel as a base point are dGx−dRxg for R, dGx for G, and dGx+dBxg for B. That is, here, the capacity is decreased by further obtaining the difference from the reference color G for R and B. This is because the necessary number of bits decreases due to the shortening of the expressed distance. The respective displacement amounts in the y direction are similarly dGy−dRyg for R, dGy for G, and dGy+dByg for B. Other than this value, the distance dx between colors that constitute the pixel is used for the final displacement amount calculation.

FIG. 14B shows the values stored in the look-up table. The displacement amount itself is as described above, but with respect to R and B, only their differences, based on dGx and dGy, which are displacement amounts between the coordinates of the reference color G or the base point W and the color G after conversion, are stored. Therefore, afterward it is possible to calculate the displacement amount and the coordinates after conversion based thereon with addition and subtraction processing. As a result, the difference values dRxg and dRyg are stored for R, and likewise the difference values dBxg and dByg are stored for B.

In the present embodiment, the coordinates prior to conversion are also stored in a table, but as in the first embodiment, a configuration may also be adopted in which the coordinates prior to conversion are associated with a memory access address, and thus a memory region for coordinates prior to conversion is not necessary.

Color Displacement Calculation Processing

Figure 15:
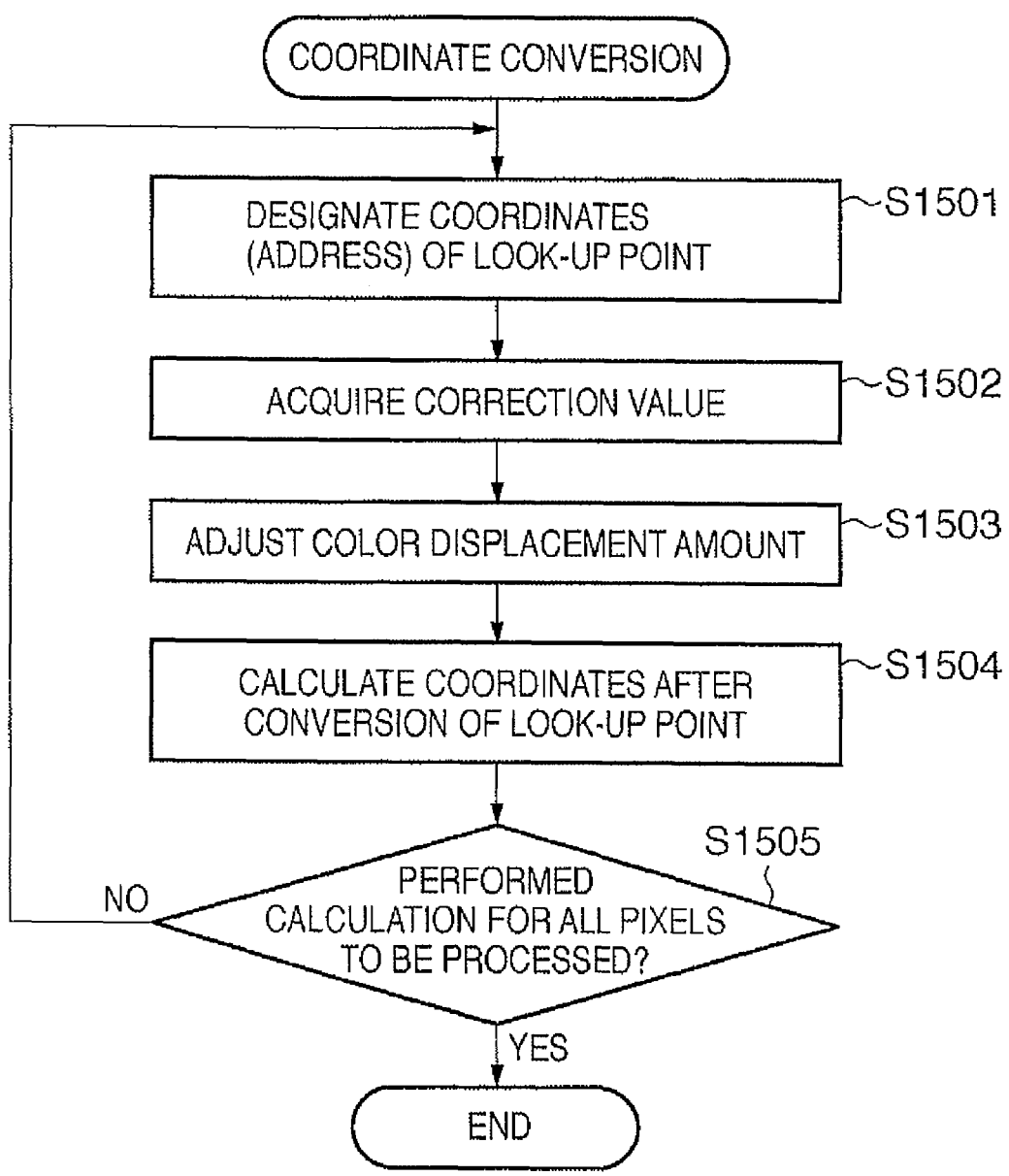
FIG. 15 is a flowchart that shows the flow of color displacement amount calculation processing.

FIG. 15 is a flowchart that shows the flow of color displacement amount calculation processing. A description of the same processing details as in FIG. 11 of the first embodiment will be omitted here. The present embodiment differs from the first embodiment in that after acquiring a correction value, the color displacement value is adjusted according to the processing principles described with reference to FIG. 13A, 13B and 13C.

The processing up to Steps S1501 and S1502 is the same as the processing of Steps S1101 and S1102 in FIG. 11, and therefore is not described here.

In Step S1503, the amount of color displacement is adjusted based on the correction amount acquired from the look-up table. The R displacement amount is calculated with the calculation formulas below, using the acquired correction values (dRxg, dRyg).

x direction displacement amount=$dGx-dRxg-dx$($dx$ is the distance between colors)

y direction displacement amount=$dGy-dRyg$

Likewise, the B displacement amount can be calculated with the calculation formulas below.

x direction displacement amount=$dGx+dBxg+dx$($dx$ is the distance between colors)

y direction displacement amount=$dGy+dByg$

By adopting a configuration in which the values of dRxg, dRyg, dBxg, dByg, and dGx and dGy are absolute values, the right side relative to the y axis when the optical origin point O is used as the coordinate origin point is found by the above formulas, and on the left side, the sign of the second terms dRxg and dBxg is reversed. Note that processing for this color displacement amount adjustment may also be performed together with calculation of coordinates after conversion.

Next, in Step S1504, the coordinates after conversion of the look-up point are calculated. Specifically, the displacement amount of each color obtained in Step S1503 is added to or subtracted from the coordinates prior to conversion of the look-up point, which are the coordinates at the pixel base point.

The processing in Step S1505 is the same as the processing in Step S1104 in FIG. 11, and therefore is not described here.

As described above, according to the present embodiment, by using a look-up table of a symmetrical system even when the arrangement of pixels is not symmetrical, it is possible to realize a reduction in the memory capacity used to constitute the table and a reduction in circuit scale, as well as increased processing speed, while maintaining coordinate conversion accuracy. Note that a reduction in memory capacity contributes to a reduction in the number of chips and substrate surface area, so that reduced costs are realized, and the number of times the look-up table is accessed is also reduced. As a result, it is also possible to realize increased processing speed, and reduced power consumption.

Third Embodiment

Next is a description of a third embodiment of the present invention with reference to the drawings. In the first and second embodiments, the coordinates of a look-up pixel, which is a pixel after conversion, are adjusted. In the present embodiment, at least one of adjustment of the original information itself of the look-up pixel, and revision of the address of a final interpolated position corresponding to the display position of each color, is performed. Thus, coordinate conversion and interpolation processing are performed in consideration of the effect of constituting the pixel from a plurality of colors.

Principles of Reference Coordinate Correction

Figure 16A:
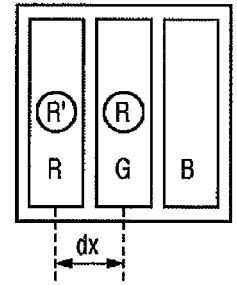
FIGS. 16A, 16B, 16C, and 16D are schematic diagrams that show principles of look-up pixel reference coordinate correction.

FIGS. 16A, 16B, 16C, and 16D are schematic diagrams that show principles of look-up pixel reference coordinate correction. FIG. 16A is a schematic diagram that shows a principle of revising the look-up position with focus on R among the filters of the colors that constitute a pixel. When the resolution of the display device is sufficiently high relative to the angle of view, it is possible to consider a pixel as expressing a point, and possible to consider that each pixel has a value of each color in the point that is not dependent on the color. However, in an HMD, ordinarily the resolution is low relative to the angle of view, and not high enough that the pixels cannot be separated. Therefore, in the present embodiment, assuming that the resolution of the display device is low, the values of the colors of the look-up pixel are revised according to the position of each color.

Specifically, the output of the primary color elements included in each pixel of the display device, positioned surrounding the display position of a calculated display image pixel, is adjusted to interpolate the display of the pixels of the display image. Thus, it is possible to increase the quality of the display image even in a configuration where resolution is low relative to the angle of view.

In FIG. 16A, when performing correction of optical aberration with respect to R, the position of the look-up point used as the correction base point, when the entire display device is observed macroscopically, that is, when the resolution is sufficiently high relative to the angle of view, can be viewed as the same as the pixel center position, which is G. On the other hand, when each pixel of the display device can be observed in detail, that is, when the resolution is low relative to the angle of view, the look-up position serving as the correction base point is the center position R' of the color R.

When the position of the display point after coordinate conversion does not match the position of the center point of the pixel of the display device, the display point is expressed by interpolation with the pixels surrounding that display point. Accordingly, in the present embodiment, a new value of the color R is calculated based on the values of the surrounding pixels. A linear interpolation technique may be used, or a higher order interpolation technique may be used.

Figure 16B:
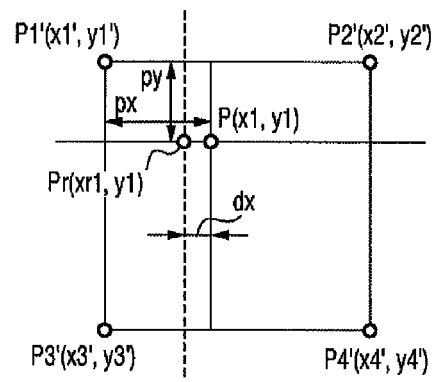

FIG. 16B is a schematic diagram that shows the principle of interpolation processing. In the interpolation processing, ordinarily the pixel center position is considered an interpolated position, but here, the interpolated position is revised with the position of the filter of each color. In FIG. 16B, the interpolated position is shifted to the left, with focus on R.

First, ordinary interpolation processing will be described. From lens aberration information and resolution information in which a display center coordinate O (x0, y0) in a two-dimensional coordinate system is used as an origin point, an aberration amount is obtained for the respective positions of each pixel in the two-dimensional coordinate system. Also, respective coordinate conversion amounts in the x axis direction and the y axis direction for performing correction by this aberration amount are obtained for each pixel.

Then a correction parameter is obtained in order to obtain, via interpolation calculation, image data (values for each of RGB) at each pixel position (proper pixel position) in the two-dimensional coordinate system when coordinate conversion of each color of each pixel by the obtained coordinate conversion amount has been performed.

When revision of the interpolated position is not performed, that is, when the pixel center is used as the interpolated position regardless of the color, as shown in FIG. 16B, image data (x1, y1) of a pixel P1 is obtained based on the values of four pixels P1', P2', P3', and P4' surrounding this pixel P1 after coordinate conversion. Specifically, where the coordinates of the pixels P1', P2', P3', and P4' are P1' (x1', y1'), P2' (x2', y2'), P3' (x3', y3'), and P4' (x4', y4'), that image data is obtained via interpolation calculation according to the below formula.

$P1(x1,y1)=P1' \cdot (1-px)(1-py)+P2' \cdot px(1-py)+P3' \cdot (1-px)py+P4' \cdot px \cdot py$ Note that px and py express the deviation of the position of the pixel expressed by the image data prior to coordinate conversion from the position of the pixel expressed by the image data after coordinate conversion. Here, the following equations hold:

$px=(x1-x')/(x2'-x1')$ and $py=(y1-y3')/(y1'-y3')$

In the present embodiment, as a correction parameter, data for performing conversion according to the above formulas, that is, in conversion to the image data P1 (x1, y1) according to the above formulas, data x, y that expresses the address of the pixel for which image data is to be looked up and constants px and py, are obtained. Note that x and y respectively express the coordinates after conversion. Conversion of the image data of each pixel according to the above formulas corresponds to correction of image data such that, substantially, the image distorts in the opposite direction to the direction of distortion aberration.

The above description applies to the color G, where the pixel center position matches the position of the color, but when revising the interpolated position, shifting of the interpolated position according to the arrangement of colors in the pixel is necessary. That is, in the case of the color R, the interpolated position will be Pr (xr1, y1), which is shifted in the left direction by a distance dx in the color space. Here, xr1=x1−dx.

Here, a case of executing linear interpolation processing indicated in the above formulas was described, but interpolation processing according to a cubic polynomial formula, typified by bicubic interpolation, or an interpolation algorithm by nearest approximation such as nearest neighbor interpolation, may be adopted.

Figure 16C:
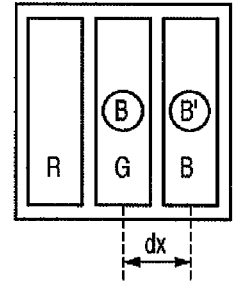
Figure 16D:
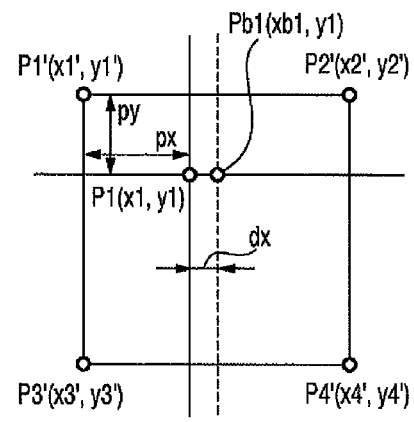

FIG. 16C is a schematic diagram that shows a principle of revising the look-up position with focus on B among the colors that constitute a pixel. FIG. 16D is a schematic diagram that shows a principle of interpolation processing of the color B. Interpolation processing of the color B can be performed in the same manner as interpolation processing of the color R.

Interpolation Processing

FIG. 17 is a flowchart that shows the flow of interpolation processing. In Step S1701, a determination is made of whether or not to perform revision of the interpolated position. When revision will be performed (YES in Step S1701), the routine proceeds to Step S1702, and when revision will not be performed (NO in Step S1701, the routine proceeds to Step S1703.

In Step S1702, processing to revise the interpolated position is performed. Revision of the interpolated position can be executed based on the technique described with reference to FIG. 16B. With respect to the color R, a position where the interpolated position obtained using the center of the pixel as a reference has been shifted in the left direction by a distance dx in the color space within the pixel is made the interpolated position. Shift processing is not performed for the color G. With respect to the color B, a position where the interpolated position obtained using the center of the pixel as a reference has been shifted in the right direction, which is the opposite direction as R, is made the interpolated position.

In Step S1703, a judgment is made of whether or not to reconfigure the look-up pixel. When selecting to reconfigure the look-up pixel, that is, when selecting processing to revise the position to be looked up according to color (YES in Step S1703), the routine proceeds to Step S1704, and when that is not selected (NO in Step S1703), the routine proceeds to Step S1705.

In Step S1704, the look-up position is revised. Revision of the look-up position can be executed based on the technique described with reference to FIG. 16A. Actually, reconfiguration is not performed by interpolation processing of the values of a new look-up pixel in which the look-up position has been shifted according to color, rather, the coordinates of the look-up pixel that are looked up when performing interpolation processing are shifted according to color. By adopting such a configuration, it is possible to realize reconfiguration of the image at the look-up point with comparatively simple processing. Note that it does not matter whether the processing to revise the interpolated position in Step S1702 or the processing to revise the look-up position in Step S1704 is performed first.

In Step S1705, the color value at the interpolated position of each color is calculated. Interpolation processing is executed at the coordinates of the look-up pixel that has been previously calculated, that is, the coordinates after conversion, and at the interpolated position where a new pixel will be generated.

In Step S1706, a judgment is made of whether or not the above interpolation processing has been performed for all of the pixels to be processed. When processing for all of the pixels has finished, interpolation processing is ended. When processing for all of the pixels has not finished, the routine returns to the beginning and interpolation processing is executed.

As described above, according to the present embodiment, in coordination with the configuration of display pixels, at least one of reconfiguration of the original image, that is, revision of the position of the look-up pixel, and revision of the interpolated position corresponding to the display position, is performed. Therefore, it is possible to achieve image quality improvement in the case of a low resolution display configuration. When a display panel having the same number of pixels and the same image size is used, this is particularly effective in an HMD that realizes a wide angle of view.

Fourth Embodiment

In the first and second embodiments, calculation of conversion coordinates is performed by table look-up address conversion, but in the present embodiment, a displacement amount is acquired and conversion coordinates are calculated for light of each primary color, using an approximation polynomial. Therefore, even if a storage apparatus that stores the aberration correction table 804 is not provided, it is possible to display a high-quality image by appropriately correcting optical aberration.

Other than coordinate conversion by table look-up address conversion, a coordinate conversion method employing an approximation polynomial is known. Ordinarily, in the case of an imaging optical system, it is possible to express an actual image height y relative to an ideal image height x with a cubic curve, which is a cubic function of x. When a complex optical system such as a free-form surface prism is used in the display optical system, when suppressing the absolute value of a difference from an approximation formula, a high order of about the tenth order may be necessary. Consequently, a coordinate set after conversion is calculated using an approximation polynomial and coefficient parameters.

As in the second embodiment, it is possible to apply an approximation polynomial of a symmetrical system even in the case of a system that is not left-right symmetrical. In other words, a configuration is adopted in which minute revisions of the coefficient parameters are made in consideration of the amount of displacement relative to the symmetry axis. As a result, an approximation polynomial in consideration of displacement amounts that differ slightly between the left and right of the display panel is not prepared, rather, an approximation polynomial for one side relative to the axis is prepared, and by adjusting the parameters that approximation polynomial can be applied to both sides.

When usage of an approximation polynomial is applied to each of the colors RGB, this results in a marked increase in circuit scale in comparison to table look-up. Here, importance is placed on the balance of circuit scale and table size. This is particularly effective when there is some excess in the logical computation circuit scale, and addition of external memory is difficult. By applying the above technique, it is possible to reduce the memory capacity for parameter storage. Also, because the same circuit has various uses, and the approximation region is reduced by half, it is also possible to reduce the order of the formula while maintaining the same accuracy.

Other Embodiments

By applying interpolation calculation to coordinate calculation itself, it is possible to further reduce the data amount to be stored in the aberration correction table 804. For example, in the case of sampling at every 8 pixels, it is possible to reduce the table size to 1/64 the total amount of data. There is a tradeoff between the accuracy of interpolation calculation and the scale of the circuit that performs interpolation calculation, but it is possible to suppress the circuit scale to some extent, depending on the application and purpose, and thus reduce the memory capacity.

Also, in the above embodiments, an example was described in which in the configuration of pixels, colors are arranged periodically in the x axis direction, but colors may also be arranged periodically in the y axis direction. Also, axes are set to the horizontal and vertical directions relative to the display panel, but those axes may be set to an inclined direction depending on the configuration of the optical system, the configuration of the display panel, and the arrangement of the apparatus, and of course the configuration described in this embodiment is also applicable in such a case as well.

Also, in the above embodiments, an example was described in which the colors of the pixels that constitute the display panel are the three primary colors RGB, but the pixel colors are not limited to these. When different colors are used, preprocessing such as color conversion may be performed as appropriate, according to those colors.

Also, in the above embodiments, mainly a case was described in which aberration correction is applied to an HMD in which an ocular enlargement optical system is adopted. However, the aberration correction according to the above embodiments is not limited to application to an HMD. For example, the same effects are of course obtained when the invention is applied to an EVF equipped with a digital single-lens reflex camera or a digital video camera, or the like.

Also, it is of course possible to use configurations described in the above embodiments in combination with each other.

Furthermore, a person with skill in the art will be easily capable of configuring a new system in which various technologies in the above embodiments are appropriately combined. Accordingly, systems formed by such various combinations can be encompassed by the technological scope of the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

According to the present invention, it is possible to provide technology whereby optical aberrations are appropriately corrected to display a high quality image even in a display device in which elements that emit each primary color are separately provided within each pixel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-263056 filed on Oct. 9, 2008, which is hereby incorporated by reference herein in its entirety.

What is claimed is:

1. An image processing apparatus that corrects chromatic aberration that occurs in a display optical system, using a display unit in which respective pixels have a plurality of primary color elements that emit light of respectively differing primary colors, the apparatus comprising:
   a first acquisition unit constructed to acquire a displacement amount of a predetermined reference primary color element as a reference displacement amount in each pixel of the display unit;
   a second acquisition unit constructed to acquire a displacement amount for each primary color element other than the reference primary color element included in the pixel, based on the position of the primary color element relative to the reference primary color element and the reference displacement amount;
   a calculation unit constructed to calculate a display position in the display unit for each primary color component of each pixel in a display image, based on the displacement amounts acquired by the first and the second acquisition units; and
   a display control unit constructed to display each primary color component of each pixel of the display image at the display position of the display unit calculated by the calculation unit.

2. The image processing apparatus according to claim 1, further comprising a storage unit constructed to store the reference displacement amount;
   wherein the first acquisition unit is constructed to read out the reference displacement amount stored in the storage unit to acquire the reference displacement amount.

3. The image processing apparatus according to claim 2, wherein when the display optical system has a shape that is symmetrical with the center of the display optical system as a reference,
   the storage unit is constructed to store the reference displacement amount for each pixel included in a quadrant of the display unit used as a reference,
   the first acquisition unit is constructed to acquire, for each reference primary color element included in a pixel that is not included in the reference quadrant, a displacement amount based on the relative position of the quadrant that includes that pixel relative to the reference quadrant, and a reference displacement amount of a pixel that corresponds to that pixel in the reference quadrant, and
   the second acquisition unit is constructed to acquire, for each primary color element other than a reference primary color element included in a pixel that is not included in the reference quadrant, a displacement amount based on the relative position of the quadrant that includes that pixel relative to the reference quadrant, and the relative position of the primary color element relative to the reference primary color element, and a reference displacement amount of a pixel that corresponds to that pixel in the reference quadrant.

4. The image processing apparatus according to claim 1, wherein the display control unit is constructed to interpolate the display of each pixel of the display image by adjusting the output of a primary color element included in each pixel of the display unit that is positioned surrounding the display position calculated by the calculation unit.

5. The image, processing apparatus according to claim 1, wherein the first and second acquisition units are constructed to acquire the displacement amounts using an approximation polynomial that corresponds to the shape of the display optical system.

6. A Head Mounted Display comprising the image processing apparatus according to claim 1.

7. An image processing method in an image processing apparatus that corrects chromatic aberration that occurs in a display optical system, using a display unit in which respective pixels have a plurality of primary color elements that emit light of respectively differing primary colors, the method comprising the steps of:

acquiring a displacement amount of a predetermined reference primary color element as a reference displacement amount in each pixel of the display unit;

acquiring a displacement amount for each primary color element other than the reference primary color element included in the pixel, based on the position of the primary color element relative to the reference primary color element and the reference displacement amount;

calculating a display position in the display unit for each primary color component of each pixel in a display image, based on the displacement amounts acquired by the first and second steps of acquiring; and displaying each primary color component of each pixel of the display image at the display position of the display unit that has been calculated in the calculating step.

8. A computer-readable storage medium on which is stored a program for causing a computer to function as the image processing apparatus according to claim 1.

* * * * *